(12) United States Patent
Bhattad et al.

(10) Patent No.: US 10,959,259 B2
(45) Date of Patent: Mar. 23, 2021

(54) TECHNIQUES FOR BASE AND EXTENDED GRANTS

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/420,973

(22) Filed: May 23, 2019

(65) Prior Publication Data

US 2019/0364592 A1 Nov. 28, 2019

(30) Foreign Application Priority Data

May 25, 2018 (IN) .............................. 201841019662

(51) Int. Cl.
*H04W 72/14* (2009.01)
*H04W 74/08* (2009.01)
*H04W 72/04* (2009.01)

(52) U.S. Cl.
CPC ......... *H04W 72/14* (2013.01); *H04W 72/042* (2013.01); *H04W 72/0446* (2013.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2016/0345206 | A1* | 11/2016 | Yerramalli | H04J 11/00 |
| 2017/0127442 | A1* | 5/2017 | Sun | H04W 72/14 |
| 2019/0053211 | A1* | 2/2019 | Ying | H04W 72/044 |
| 2019/0150170 | A1* | 5/2019 | Park | H04W 72/1268 370/329 |

(Continued)

FOREIGN PATENT DOCUMENTS

EP 3319385 A1 5/2018

OTHER PUBLICATIONS

International Search Report and Written Opinion—PCT/US2019/034017—ISA/EPO—dated Jul. 15, 2019.

(Continued)

*Primary Examiner* — Eunsook Choi
(74) *Attorney, Agent, or Firm* — Liem T. Do

(57) ABSTRACT

Methods, systems, and devices for wireless communications are described. A wireless communications system may support grants for uplink or downlink transmission over multiple transmission time intervals (TTIs). A multi-TTI grant may include a base grant and an extended grant that include separate information and may be transmitted simultaneously (e.g., within the same TTI) or separately. A grant type (e.g., whether a grant is a base grant or an extended grant) or an association between a base grant and an extended grant may be conveyed (e.g., via the multi-TTI grant). A downlink assignment index (DAI) may be included for one or more TTIs subject to the multi-TTI. For instance, DAI may be included for each TTI or for a subset of TTIs.

30 Claims, 21 Drawing Sheets

(56) References Cited

U.S. PATENT DOCUMENTS

2019/0364592 A1* 11/2019 Bhattad ............. H04W 72/0446

OTHER PUBLICATIONS

Nokia et al., "On LAA UL Scheduling and UL Grant Enhancements", 3GPP Draft; R1-162784, 3rd Generation Partnership Project (3GPP), Mobile Competence Centre ; 650, Route Des Lucioles ; F-06921 Sophia-Antipolis Cedex; France, vol. RAN WG1, No. Busan, Korea; Apr. 11, 2016-Apr. 15, 2016, Apr. 1, 2016 (Apr. 1, 2016), XP051079683, 9 Pages, Retrieved from the Internet: URL:http://www.3gpp.org/ftp/tsg_ran/WG1_RL1/TSGR1_84b/Docs/ [retrieved on Apr. 1, 2016], sections 3 to 3.4.

Qualcomm Incorporated: "Downlink Design for Shortened TTI", 3GPP TSG RAN WG1 #86, R1-166309, DL Design for Shortened TTI, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 13, 2016, XP051132725, Retrieved from the Internet: URL:http://www.3gpp.org/ftp/tsg_ran/WG1_RL1/TSGR1_86/Docs/, 14 pages, section 2.2.2.

Qualcomm Incorporated: "Enhancements to Scheduling and HARQ Operation for NR-U", 3GPP Draft; R1-1807391, 7.6.4.3 Enhancements to Scheduling and HARQ Operation for NR-U, 3rd Generation Partnership Project (3GPP), Mobile Competence Centre ; 650, Route Des Lucioles ; F-06921 Sophia-An, vol. RAN WG1, No. Busan, Korea; May 21, 2018-May 25, 2018, May 12, 2018 (May 12, 2018), XP051463082, 6 Pages, Retrieved from the Internet: URL:http://www.3gpp.org/ftp/tsg%5Fran/WG1%5FRL1/TSGR1%5F93/Docs [retrieved on May 12, 2018], section 2, sections 3 to 3.2.

* cited by examiner

TECHNIQUES FOR BASE AND EXTENDED GRANTS

CROSS REFERENCE

The present Application for Patent claims the benefit of India Provisional Patent Application No. 201841019662 by BHATTAD et al., entitled "TECHNIQUES FOR BASE AND EXTENDED GRANTS," filed May 25, 2018, assigned to the assignee hereof, and expressly incorporated herein.

BACKGROUND

The following relates generally to wireless communications, and more specifically to techniques for base and extended grants as applied to a multiple transmission time interval (multi-TTI) grant.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In a wireless communications system, a base station may transmit a physical downlink control channel (PDCCH) to a user equipment (UE) (e.g., to indicate uplink or downlink resource allocations). The PDCCH may include downlink control information (DCI), which may include an uplink grant and/or downlink grant. An uplink grant may indicate uplink resources that a UE may use to transmit data to the base station, while a downlink grant may indicate downlink resources that a UE may use to receive data from the base station. In some cases, the base station may verify that downlink data was successfully received by the UE and to do so, the UE may perform a Hybrid Automatic Repeat Request (HARQ) procedure, in which data may be sent to the UE one or more times until decoding of the data is successful.

A HARQ procedure may involve a UE receiving the data and transmitting an acknowledgement (ACK) or negative ACK (NACK) to the base station in response. For example, an ACK may be sent if the UE determines that the data has been successfully decoded and a NACK may be sent if the UE determines that the data has not been successfully decoded, which may trigger retransmission of the data. In some cases, there may be multiple DCIs for multiple HARQ processes (e.g., a downlink control burst) being sent in conjunction. In response, multiple ACKs and/or NACKs (e.g., an uplink control burst) may be sent to the base station in response. In some cases, performing a HARQ procedure for multiple HARQ processes may involve transmission of DCI for each HARQ procedure, which may cause increased control overhead. Further, there may not be enough space in a downlink control burst to carry enough uplink grants to support long uplink bursts (e.g., longer than the number of sent DCIs).

In conventional systems, an uplink grant may be transmitted for each TTI, which may cause increased overhead and, in some cases, may involve switching between downlink and uplink (e.g., in each TTI). Further, in unlicensed spectrums, contention based procedures such as listen-before-talk may be performed more often (e.g., for each downlink control information (DCI)), which may result in potential loss of the transmission medium.

SUMMARY

The described techniques relate to improved methods, systems, devices, and apparatuses that support techniques for base and extended grants. Generally, the described techniques provide support for grants over multiple transmission time intervals (TTIs) (e.g., a multi-TTI grant), which may be transmitted from a base station to a user equipment (UE). A multi-TTI grant is a single grant that allocates resources for multiple transport blocks (TBs) over multiple time durations (e.g., TTIs, slots, subframes). Multi-TTI grants may be used in a variety of spectrums (e.g., licensed, unlicensed, or shared spectrum). In some cases, parameters of the TTIs subject to the multi-TTI grant may vary from a first TTI to a second TTI. In such instances, an indication of the parameters that change from the first TTI to the second TTI may be conveyed via the multi-TTI grant. For instance, the parameters that may change from a first TTI to a second TTI may be a code block group level transmission information (CBGLTI), a new data indicator (NDI), a downlink assignment index (DAI), a resource allocation, a mini-slot or full slot configuration, or a hybrid automatic repeat request (HARQ) identifier (ID), among others.

The multi-TTI grant may include a base grant and an extended grant for uplink or downlink transmissions, which may be transmitted simultaneously or separately. An indication of the grant type (e.g., whether the grant is a base grant or an extended grant) may be conveyed to a UE via one or bits in either the base grant, the extended grant, or both. Alternatively, a different identifier (e.g., a radio network temporary ID (RNTI)) may be use for each of the base grant and the extended grant. In some cases, an indication of whether an extended grant is associated with a particular base grant may be included in either the base grant, the extended grant, or both. For instance, the extended grant may include a timing offset that indicates a location of the base grant. In other cases, an association ID may be included in one or both of the base grant and the extended grant, which may provide a correspondence between a base grant and one or more extended grants.

A method of wireless communications is described. The method may include identifying a set of parameters for transmission of data via a shared channel over multiple TTIs, transmitting, to a UE, a multi-TTI grant including a base grant and an extended grant, where the base grant indicates a first subset of parameters and the extended grant indicates a second subset of parameters, and communicating with the UE in accordance with the first and second subsets of parameters.

An apparatus for wireless communications is described. The apparatus may include a processor, memory in electronic communication with the processor, and instructions stored in the memory. The instructions may be executable by the processor to cause the apparatus to identify a set of parameters for transmission of data via a shared channel over multiple TTIs, transmit, to a UE, a multi-TTI grant including a base grant and an extended grant, where the base grant indicates a first subset of parameters and the extended grant indicates a second subset of parameters, and communicate with the UE in accordance with the first and second subsets of parameters.

Another apparatus for wireless communications is described. The apparatus may include means for identifying a set of parameters for transmission of data via a shared channel over multiple TTIs, transmitting, to a UE, a multi-TTI grant including a base grant and an extended grant, where the base grant indicates a first subset of parameters and the extended grant indicates a second subset of parameters, and communicating with the UE in accordance with the first and second subsets of parameters.

A non-transitory computer-readable medium storing code for wireless communications is described. The code may include instructions executable by a processor to identify a set of parameters for transmission of data via a shared channel over multiple TTIs, transmit, to a UE, a multi-TTI grant including a base grant and an extended grant, where the base grant indicates a first subset of parameters and the extended grant indicates a second subset of parameters, and communicate with the UE in accordance with the first and second subsets of parameters.

Some examples of the method, apparatuses, and non-transitory computer-readable medium described herein may further include operations, features, means, or instructions for transmitting, to the UE, an indication of a grant type for the base grant or the extended grant.

In some examples of the method, apparatuses, and non-transitory computer-readable medium described herein, the indication may be included in a multi-TTI grant and includes a set of bits that indicate the grant type.

In some examples of the method, apparatuses, and non-transitory computer-readable medium described herein, transmitting the indication of the grant type may include operations, features, means, or instructions for transmitting the base grant according to a first RNTI and transmitting the extended grant according to a second RNTI different from the first RNTI.

Some examples of the method, apparatuses, and non-transitory computer-readable medium described herein may further include operations, features, means, or instructions for transmitting, to the UE, an association between the base grant and the extended grant.

In some examples of the method, apparatuses, and non-transitory computer-readable medium described herein, the base grant and the extended grant may be transmitted within the same TTI.

In some examples of the method, apparatuses, and non-transitory computer-readable medium described herein, transmitting the association may include operations, features, means, or instructions for transmitting, in a first TTI, the base grant corresponding to an association ID and transmitting the extended grant corresponding to the base grant in a second TTI different from the first TTI.

In some examples of the method, apparatuses, and non-transitory computer-readable medium described herein, the association ID may be included in a payload of the base grant, the extended grant, or both.

In some examples of the method, apparatuses, and non-transitory computer-readable medium described herein, the association ID includes a time delta between the base grant and the extended grant.

In some examples of the method, apparatuses, and non-transitory computer-readable medium described herein, the multi-TTI grant indicates a group of parameters that differ between a first TTI and a second TTI of the multiple TTIs.

In some examples of the method, apparatuses, and non-transitory computer-readable medium described herein, the group of parameters includes CBGLTI, a NDI, total DAI, a HARQ ID, a redundancy version (RV) ID, a resource allocation, mini-slot or full slot configuration information, a clear channel assessment (CCA) occasion, a downlink control information (DCI) parameter, a multi-input multi-output (MIMO) configuration, or any combination thereof.

In some examples of the method, apparatuses, and non-transitory computer-readable medium described herein, the multi-TTI grant includes a DAI for a subset of TTIs of the multiple TTIs.

In some examples of the method, apparatuses, and non-transitory computer-readable medium described herein, the multi-TTI grant includes one of multiple DAIS for the subset of TTIs, respective DAIS for each TTI of the multiple TTIs, a set of DAIS for a corresponding set of TTIs of the multiple TTIs and a bitmap indicating the set of TTIs, a TTI pattern for the DAI, a single DAI value for the multiple TTIs, or DAI for a serving cell and monitoring occasion pairing.

In some examples of the method, apparatuses, and non-transitory computer-readable medium described herein, a total DAI may be included in the extended grant, where the total DAI may be associated with a set of TTIs having control information multiplexed with data.

Some examples of the method, apparatuses, and non-transitory computer-readable medium described herein may further include operations, features, means, or instructions for transmitting a subsequent grant including a second DAI for the at least one TTI, where the second DAI of the subsequent grant overrides the DAI of the multi-TTI grant.

Some examples of the method, apparatuses, and non-transitory computer-readable medium described herein may further include operations, features, means, or instructions for transmitting a downlink grant after the multi-TTI grant, where a downlink assignment index (DAI) of the downlink grant may be based on one or more DAIS of the multi-TTI grant.

Some examples of the method, apparatuses, and non-transitory computer-readable medium described herein may further include operations, features, means, or instructions for transmitting DCI that indicates a number of mini-slots for CCA, a maximum or minimum number of mini-slots to use before switching to a slot, or a combination thereof.

In some examples of the method, apparatuses, and non-transitory computer-readable medium described herein, communicating with the UE may include operations, features, means, or instructions for receiving, from the UE, the transmission of data via the shared channel over multiple TTIs in accordance with the base grant and the extended grant.

In some examples of the method, apparatuses, and non-transitory computer-readable medium described herein, communicating with the UE may include operations, features, means, or instructions for transmitting, to the UE, the transmission of data via the shared channel over multiple TTIs in accordance with the base grant and the extended grant.

A method of wireless communications is described. The method may include receiving, from a base station, a multi-TTI grant including a base grant and an extended grant for transmission of data via a shared channel over multiple TTIs, where the base grant includes a first subset of transmission parameters and the extended grant includes a second subset of transmission parameters and communicating with the base station in accordance with the first and second subsets of parameters.

An apparatus for wireless communications is described. The apparatus may include a processor, memory in electronic communication with the processor, and instructions stored in the memory. The instructions may be executable by the processor to cause the apparatus to receive, from a base station, a multi-TTI grant including a base grant and an extended grant for transmission of data via a shared channel over multiple TTIs, where the base grant includes a first subset of transmission parameters and the extended grant includes a second subset of transmission parameters and communicate with the base station in accordance with the first and second subsets of parameters.

Another apparatus for wireless communications is described. The apparatus may include means for receiving, from a base station, a multi-TTI grant including a base grant and an extended grant for transmission of data via a shared channel over multiple TTIs, where the base grant includes a first subset of transmission parameters and the extended grant includes a second subset of transmission parameters and communicating with the base station in accordance with the first and second subsets of parameters.

A non-transitory computer-readable medium storing code for wireless communications is described. The code may include instructions executable by a processor to receive, from a base station, a multi-TTI grant including a base grant and an extended grant for transmission of data via a shared channel over multiple TTIs, where the base grant includes a first subset of transmission parameters and the extended grant includes a second subset of transmission parameters and communicate with the base station in accordance with the first and second subsets of parameters.

Some examples of the method, apparatuses, and non-transitory computer-readable medium described herein may further include operations, features, means, or instructions for receiving, from the base station, an indication of a grant type for the base grant or the extended grant.

In some examples of the method, apparatuses, and non-transitory computer-readable medium described herein, the indication may be included in a multi-TTI grant and includes a set of bits that indicate the grant type.

Some examples of the method, apparatuses, and non-transitory computer-readable medium described herein may further include operations, features, means, or instructions for receiving the base grant according to a first RNTI and receiving the extended grant according to a second RNTI different from the first RNTI.

Some examples of the method, apparatuses, and non-transitory computer-readable medium described herein may further include operations, features, means, or instructions for receiving, from the base station, an association between the base grant and the extended grant.

In some examples of the method, apparatuses, and non-transitory computer-readable medium described herein, the base grant and the extended grant may be received within the same TTI.

Some examples of the method, apparatuses, and non-transitory computer-readable medium described herein may further include operations, features, means, or instructions for receiving, in a first TTI, the base grant corresponding to an association ID and receiving the extended grant corresponding to the base grant in a second TTI different from the first TTI.

In some examples of the method, apparatuses, and non-transitory computer-readable medium described herein, the association ID may be included in a payload of the base grant, the extended grant, or both.

In some examples of the method, apparatuses, and non-transitory computer-readable medium described herein, the association ID includes a time delta between the base grant and the extended grant.

In some examples of the method, apparatuses, and non-transitory computer-readable medium described herein, the multi-TTI grant indicates a group of parameters that differ between a first TTI and a second TTI of the multiple TTIs.

In some examples of the method, apparatuses, and non-transitory computer-readable medium described herein, the group of parameters includes CBGLTI, a NDI, total DAI, a HARQ ID, a RVID, a resource allocation, mini-slot or full slot configuration information, a CCA occasion, a DCI parameter, a MIMO configuration, or any combination thereof.

In some examples of the method, apparatuses, and non-transitory computer-readable medium described herein, the multi-TTI grant includes a DAI for a subset of TTIs of the multiple TTIs.

In some examples of the method, apparatuses, and non-transitory computer-readable medium described herein, the multi-TTI grant includes one of multiple DAIs for the subset of TTIs, respective DAIs for each TTI of the multiple TTIs, a set of DAIs for a corresponding set of TTIs of the multiple TTIs and a bitmap indicating the set of TTIs, a TTI pattern for the DAI, a single DAI value for the multiple TTIs, or DAI for a serving cell and monitoring occasion pairing.

In some examples of the method, apparatuses, and non-transitory computer-readable medium described herein, a total DAI may be included in the extended grant, where the total DAI may be associated with a set of TTIs having control information multiplexed with data.

In some examples of the method, apparatuses, and non-transitory computer-readable medium described herein, the multi-TTI may be a grant for a downlink shared channel.

Some examples of the method, apparatuses, and non-transitory computer-readable medium described herein may further include operations, features, means, or instructions for calculating a total DAI based on the multiple TTIs subject to the multi-TTI grant.

Some examples of the method, apparatuses, and non-transitory computer-readable medium described herein may further include operations, features, means, or instructions for receiving DCI that indicates a number of mini-slots for CCA, a maximum or minimum number of mini-slots to use before switching to a slot, or a combination thereof.

Some examples of the method, apparatuses, and non-transitory computer-readable medium described herein may further include operations, features, means, or instructions for identifying a start location for performing a listen-before-talk (LBT) procedure based on receiving the multi-TTI grant.

Some examples of the method, apparatuses, and non-transitory computer-readable medium described herein may further include operations, features, means, or instructions for receiving a subsequent grant including a second DAI for the at least one TTI, where the second DAI of the subsequent grant overrides the DAI of the multi-TTI grant.

Some examples of the method, apparatuses, and non-transitory computer-readable medium described herein may further include operations, features, means, or instructions for performing an LBT procedure prior to the transmission of data based on the multi-TTI grant and determining whether to transmit data based on a result of the LBT procedure.

Some examples of the method, apparatuses, and non-transitory computer-readable medium described herein may further include operations, features, means, or instructions for identifying a set of TTIs of the multiple TTIs for transmission of a feedback message based on the multi-TTI grant, performing a LBT procedure prior to a start of transmission of the multiple TTIs and determining whether to transmit the feedback message based on a result of the LBT procedure.

Some examples of the method, apparatuses, and non-transitory computer-readable medium described herein may further include operations, features, means, or instructions for determining a failure of the LBT procedure and transmitting the feedback message in a subsequent TTI delayed from the TTI.

Some examples of the method, apparatuses, and non-transitory computer-readable medium described herein may further include operations, features, means, or instructions for determining a failure of the LBT procedure and multiplexing the feedback message in a mini-slot or a start of a slot based on the failure.

In some examples of the method, apparatuses, and non-transitory computer-readable medium described herein, communicating with the base station may include operations, features, means, or instructions for transmitting, to the base station, the transmission of data via the shared channel over multiple TTIs in accordance with the base grant and the extended grant.

In some examples of the method, apparatuses, and non-transitory computer-readable medium described herein, communicating with the base station may include operations, features, means, or instructions for receiving, from the base station, the transmission of data via the shared channel over multiple TTIs in accordance with the base grant and the extended grant.

DETAILED DESCRIPTION

A wireless communications system may support grants for multiple transmission time intervals (TTIs). For instance, a base station may transmit a multi-TTI grant to a UE, which indicates multiple TTIs allocated for uplink or downlink transmissions between the UE and the base station. In some examples, the multi-TTI may include a base grant and one or more extended grants. The base grant and the extended grant may each include various parameters that may be indicated to a UE for reception of a downlink signal (e.g., via a physical downlink shared channel (PDSCH) in a case of a downlink grant, for instance) or for transmission of an uplink signal by the UE (e.g., via a physical uplink shared channel (PUSCH) in a case of an uplink grant, for instance).

According to some aspects, a base grant and an extended grant may be distinguishable from one another via implicit or explicit indications. For instance, a base grant or an extended grant may include a set of one or more bits used to indicate a corresponding grant type (e.g., whether the grant is a base grant or an extended grant). In other cases, the base grant may be associated with an identifier such as a radio network temporary identifier (RNTI) that is different from an RNTI associated with the extended grant.

A base grant may be associated with one or more extended grants. For example, a base grant and an extended grant may be transmitted in the same TTI. In other cases, the base grant and the extended grant may be transmitted in separate TTIs and an association between the extended grant and a corresponding base grant may be conveyed to the UE. For instance, a base station may include an association ID in one or both of the base grant or the extended grant, which may indicate a correspondence between the base grant and one or more extended grants.

Parameters for one or more TTIs subject to a multi-TTI grant may have varying parameters. Parameters such as a multiple-input multiple-output (MIMO) configuration may be the same across multiple TTIs, but in some cases, the parameters may vary. An indication of the parameters that vary for each TTI may be included in the multi-TTI grant or via information transmitted in each TTI. Downlink assignment index (DAI), for example, may differ for one or more TTIs of the multiple TTIs subject to the multi-TTI grant (e.g., where each TTI is allocated resources by an uplink grant may transmit a PUSCH). In other cases, a single value for DAI or a pattern of DAIs may be conveyed for one or more TTIs.

Aspects of the disclosure are initially described in the context of wireless communications systems. Aspects are then described with reference to grant procedures, a multi-TTI grant feedback scheme, and a process flow. Aspects of the disclosure are further illustrated by and described with reference to apparatus diagrams, system diagrams, and flowcharts that relate to techniques for base and extended grants.

Figure 1:
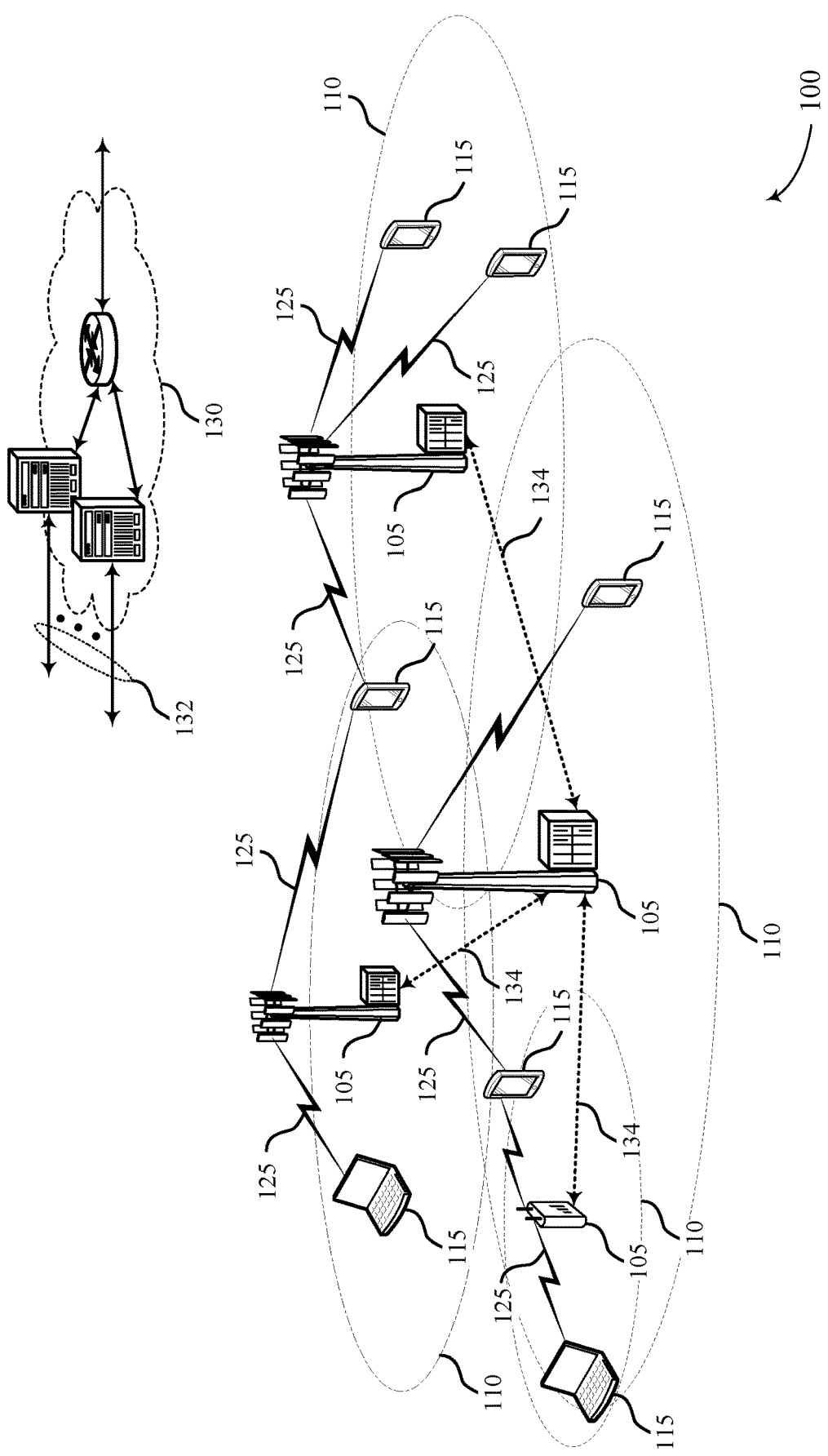
FIG. 1 illustrates an example of a wireless communications system that supports techniques for base and extended grants in accordance with aspects of the present disclosure.

FIG. 1 illustrates an example of a wireless communications system 100 that supports techniques for base and extended grants in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support multi-TTI grants for uplink and downlink transmissions. In some cases, a multi-TTI grant may include a base grant and one or more extended grants. For example, base station 105 may transmit a base grant and an extended grant to a UE 115. The base grant and the extended grant may indicate different parameters (e.g., code block group level transmission information (CBGLTI), a full new data indicator (NDI), a total downlink assignment index (DAI), a hybrid automatic repeat request (HARQ) identifier (ID), a redundancy version (RV) ID, a resource allocation, mini-slot or full slot configuration information, a clear channel assessment (CCA) occasion, a downlink control information (DCI) parameter, a multi-input multi-output (MIMO) configuration) for multiple TTIs subject to the multi-TTI grant.

In some examples, an indication of grant type or an association between a base grant and an extended grant may be conveyed to a UE 115. For instance, an indication of the grant type may be specified by a set of bits included in the base grant, the extended grant, or both. The association between a base grant and one or more extended grants may be conveyed implicitly (e.g., via different RNTIs associated with each grant) or explicitly (e.g., via a set of bits used for indicating the association.

A multi-TTI grant may also include DAI for at least one TTI of the multiple TTIs subject to the multi-TTI grant. The DAI may be a single value for one or more TTIs or may differ for each TTI.

A wireless communications system may support grants for uplink or downlink transmission over multiple TTIs. A multi-TTI grant may include a base grant and an extended grant that include separate information and may be transmitted simultaneously (e.g., within the same TTI) or separately. A grant type (e.g., whether a grant is a base grant or an extended grant) or an association between a base grant and an extended grant may be conveyed (e.g., via the multi-TTI grant). A DAI may be included for one or more TTIs subject to the multi-TTI. For instance, DAI may be included for each TTI or for a subset of TTIs.

Figure 2:
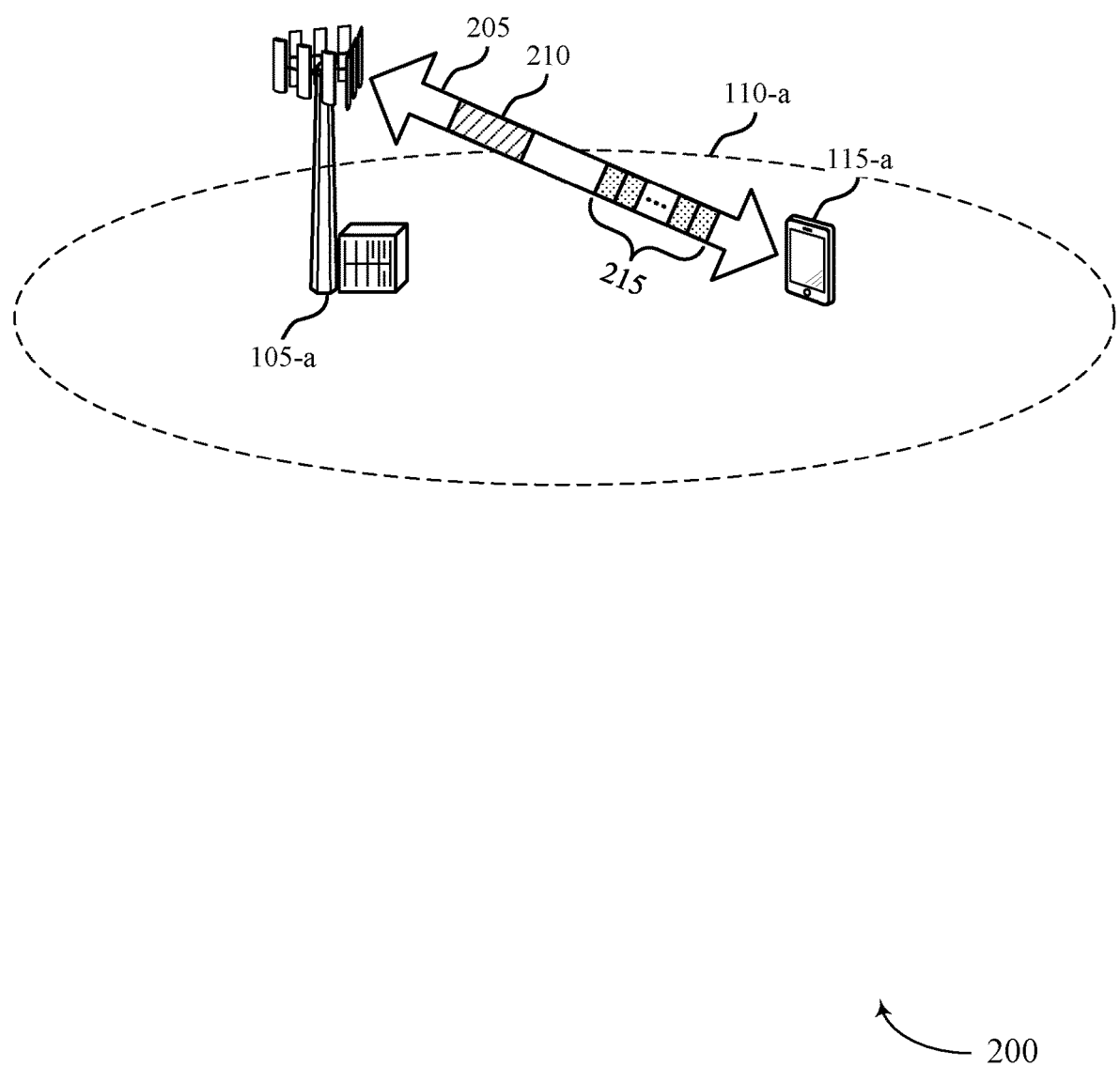
FIG. 2 illustrates an example of a wireless communications system that supports techniques for base and extended grants in accordance with aspects of the present disclosure.

FIG. 2 illustrates an example of a wireless communications system 200 that supports techniques for base and extended grants in accordance with aspects of the present disclosure. In some examples, wireless communications system 200 may implement aspects of wireless communications system 100.

Wireless communications system 200 includes a base station 105-a in communication with a UE 115-a, which may be examples of the corresponding devices as described with reference to FIG. 1. Base station 105-a may provide communication coverage for a coverage area 110-a. Base station 105-a and UE 115-a may communicate on resources of a communication link 205.

Wireless communications system 200 may support multi-TTI grants. A multi-TTI grant 210 may include one or more bits used to indicate the number of transport blocks (TBs) (or TTIs) 215 allocated for transmission. Base station 105-a may transmit multi-TTI grant 210 over communication link 205. Multi-TTI grant 210 may be an uplink grant or downlink grant allocating resources for multiple uplink (e.g., TBs 215) or downlink transmissions. In some embodiments, multi-TTI grant 210 may include a single DCI in a single slot. In other embodiments, multi-TTI grant 210 may include multiple DCIs transmitted in a single slot. In this case, one DCI may be designated as a base grant and the other DCIs may be designated as extended grants. In other embodiments, multi-TTI grant 210 may include multiple DCIs transmitted over more than one slot. In this case, one DCI designated as a base grant may be transmitted in the first slot. The other DCIs may be designated as extended grants. Some of these extended grant DCIs may be transmitted in the same slot as the base grant while others may be transmitted in a later slot.

In some examples, the characteristics (e.g., the length) and/or other transmission parameters may be the same for each TB 215 included in the multi-TTI grant 210. Some parameters, however, may vary in value from TB to TB (or from TTI to TTI). Thus, in some examples, an explicit or implicit indication may be provided to indicate the parameters that change from TB 215 to TB 215 (or TTI to TTI) or the values of such parameters for at least some of the TBs 215 (or TTIs) may additionally or alternatively be provided. Including an indication of such parameters and corresponding values may increase the size of a DCI. In some cases, limiting the size of the DCI may be beneficial (e.g., there may be a limit on the number of TBs that is allocated for transmission and/or on the number of uplink slots indicated by a single DCI to be used for TB aggregation). Thus, while using a multi-TTI grant 210 in a single DCI may reduce control overhead, there may be situations where a large number (e.g., larger than within a single DCI of a conventional size) of TBs 215 may be transmitted (e.g., 10 ms transmission opportunity (TxOP) in downlink or uplink for 960 kHz subcarrier spacing (SCS)).

Certain parameters may vary from TB 215 to TB 215 and, thus, multiple instances of these parameters may be included in a multi-TTI grant 210 to account for each TB. For example, HARQ ID may determine the HARQ process to which a TB corresponds. Code-block group (CBG) level transmission information may indicate which CBGs correspond to a particular HARQ ID. Full new data indicator (NDI) may indicate whether the portion of the current transmission corresponding to a particular HARQ ID includes new information or is a retransmission of previous information. Total Downlink Assignment Index (DAI) may convey a number of ACK bits to be transmitted (e.g., via multiplexing with a PUSCH). Resource allocation may stay the same (e.g., using the same time-domain and frequency-domain resources) for some TTIs or may vary. For example, it may be desirable for some slots to include LBT gaps and for others to exclude LBT gaps. One or more bits per TTI in the multi-TTI grant 210 may be included in the multi-TTI grant to accommodate for such a modification or other modifications to resource allocation (RA).

In some cases, information related to the utilization of mini-slots and full-slots may be included in the multi-TTI grant 210. Information related to when UE 115-a is able to perform LBT may also be included. For example, a multi- TTI grant 210 may allocate 10 uplink slots to UE 115-*a* and may indicate that LBT is allowed prior to the first, fourth, and seventh slot. In one case, UE 115-*a* may be configured to transmit as many TBs 215 as possible if LBT passes once. For instance, if LBT succeeds in the first slot, which may be start location, UE 115-*a* may transmit TBs 215 starting at the first slot. If not, UE 115-*a* may not transmit any TBs until LBT is performed again at the fourth slot. If LBT succeeds at the fourth slot, UE 115-*a* may transmit TBs 215 starting at the fourth slot. In other cases, UE 115-*a* may be configured to perform LBT each time it is assigned, regardless of whether LBT succeeded beforehand. For instance, LBT may succeed at the first slot and UE 115-*a* may begin transmitting TBs 215. Just prior to the fourth slot, however, UE 115-*a* may perform LBT again, which may determine whether TBs 215 are transmitted until the next LBT opportunity (e.g., the seventh slot). In addition to the above parameters, the multi-TTI grant 210 may also include conventional DCI parameters. Information that may be common to all TTIs or all TBs 215 (e.g., resource allocation or MIMO configuration) may be reused for each TTI or TB 215.

The addition of the above parameters, which may vary from TB 215 to TB 215, to a multi-TTI grant 210 may result in an increased DCI size. One option is to limit the value range (or flexibility) of parameters and/or to include only a certain subset of the above parameters such that the parameters indicated fit into a single DCI. Additionally or alternatively, some or all of this additional information and/or information common to all of the TBs 215 may be fit into a second extended DCI or split between the first DCI and second extended DCI. UE 115-*a* may get the full information by decoding the first DCI and one or more extended DCIs.

A multi-TTI grant 210 may be used as uplink grants for technologies operating according to LAA. In some cases, a multi-TTI grant 210 may fit within a single DCI. In such cases, one or more Radio Resource Control (RRC) parameters may be used to configure UE 115-*a* to support up to a certain number of types of TTI multiplexing (e.g., 2 or 4). Afterwards, base station 105-*a* may dynamically indicate via downlink signaling (e.g., DCI) the number of TTIs associated with a particular grant. Each uplink grant may indicate a HARQ process ID for the first uplink subframe (or slot or TTI). In some cases, the HARQ process IDs for the remaining subframes may be incremented versions of the first subframe HARQ process ID.

As described further below, other techniques may be used to determine HARQ process IDs for the remaining TTIs. For example, a multi-TTI grant 210 may include one bit per HARQ process to indicate a redundancy version identifier (RVID) for each HARQ process. Utilizing one bit may result in selection between RVID 0 or RVID 2 (e.g., excluding RVID 1 or RVID 3), which limits flexibility. A DCI may also include a NDI for each HARQ process. Both the RVID and NDI may have a fixed length per configuration (e.g., there may be one RVID bit for each TB and there may be one or two NDI bit(s) for each TB 215). The multi-TTI grant may have the same length as a conventional uplink grant. This may be accomplished as some bits of the RA field may be used for the multi-TTI grant 210, which may be possible due to the interlace structure of the resource allocation field. Such techniques may be used in other cases such as with a base grant with one or more extended grants.

In some cases, a multi-TTI grant 210 may include a base grant (e.g., within a first DCI) and one or more extended grants (e.g., within one or more additional DCIs/extended DCIs). More than one extended grant may be transmitted if one base grant and one extended grant are not sufficient to identify relevant parameters and their corresponding values (e.g., to indicate the number of TBs 215 to be sent and the values of TB-specific or subframe-specific parameters associated with each). The base grant and its corresponding one or more extended grants may be used in combination as a downlink grant or uplink grant for multiple TTIs.

In some implementations, the base grant may be a standard uplink or downlink grant. An extended grant may extend the base grant with information that is not included in the base grant (and the base grant may include information not included in the extended grant). For example, an extended grant may include a bitmap (e.g., a 16-bit bitmap) for the HARQ process IDs of each uplink subframe. Bits at one value (e.g., 1) within the bitmap may correspond to the HARQ process IDs of each TB 215 or HARQ process to be transmitted in either ascending or descending order (e.g., if the bitmap has 16 bits and bits 0, 3, and 7 are set to 1, then TBs with HARQ process IDs 0, 3, and 7 may be transmitted in ascending (0, 3, 7) or descending (7, 3, 0) order). In some cases, an extended grant may be limited to a certain number of HARQ processes, such that only a subset of the bitmap may be 1 (e.g., if there are only 8 HARQ processes, 8 of the bits in a 16-bit bitmap may be set to 1). Extended grants may also carry RVID and NDI for each HARQ process (e.g., if there are 8 HARQ processes, there may be 8×2 bits for RVID and 8×1 or 8×2 bits for NDI). In some cases, an extended grant may be zero-padded to match the same length of the base grant. In other implementations, TB-specific data and common data may be split among the base grant and the one or more extended grants (e.g., the base grant may include a HARQ process ID bitmap and an extended grant may include some data that is common to all TBs).

Certain mechanisms may be in place to identify whether a grant is a base grant or an extended grant. For example, an extended grant may be distinguished from a base grant by an explicit bit in either or both of the grants. An addition of such a bit to the base grant may increase the base grant length. Additionally or alternatively, an extended grant may be associated with a different RNTI associated than the base grant.

Additionally or alternatively, mechanisms may be in place to associate a base grant with corresponding extended grant (s). In some cases, a base grant and its extended grant(s) may be transmitted at the same time (e.g., in the same PDCCH or slot), which may indicate to UE 115-*a* that the base grant and the extended grant(s) correspond to each other. In other cases, a base grant and one or more of its extended grant(s) may not be transmitted in the same slot (e.g., due to there not being enough resources to transmit a base grant and all of its corresponding extended grants in a single slot). In this case, some information may point out the correspondence, such as a timing offset included in the base grant or extended grant that indicates the location of the extended grant relative to an base grant or the base grant relative to the extended grant, respectively. Additionally or alternatively, a few bits corresponding to an "Association ID" may be included in both the base grant and its extended grant(s). A base grant and an extended grant may correspond to each other if they have the same "Association ID".

In some implementations, UE 115-*a* may support mini-slots used to give UE 115-*a* more LBT opportunities. For example, if one mini-slot is half the size of a full slot, UE 115-*a* may be able to perform LBT twice over the time length of a full slot, while UE 115-*a* using just full slot LBT may only perform LBT once during a full slot. Upon successfully performing LBT, base station 105-*a* may allow UE 115-*a* to transmit uplink transmissions (e.g., data or control information) during a few mini-slots and switch to transmitting full slots at a slot boundary. Configuration information included in a multi-TTI grant 210 may include the number of times UE 115-*a* may attempt LBT with mini-slots before switching to performing LBT with full-slots and/or a maximum number of mini-slots that may be used to transmit uplink transmissions before switching to transmitting uplink transmissions with full slots. A certain number of mini-slots (e.g., 2) may span a full slot.

In some cases, a DAI field in a downlink grant (e.g., PDSCH grant) may include 4 bits, such as when more than one serving cell is configured in the downlink and the higher layer parameter HARQ-ACK-codebook=dynamic (e.g., the number of HARQ ACK bits that may be sent in an uplink slot may be not fixed), where the 2 most significant bits (MSB) may be the counter DAI and the 2 least significant bits (LSB) may be total DAI. In other cases, the DAI field may include 2 bits, such as when only one serving cell is configured in the downlink and the higher layer parameter HARQ-ACK-codebook=dynamic, where the 2 bits are the counter DAI. The value of total DAI may denote the total number of serving cell/PDCCH monitoring occasion pairs(s) up to the current PDCCH monitoring occasion and may be updated from PDCCH monitoring occasion to PDCCH monitoring occasion.

Meanwhile, the value of the counter DAI may denote the accumulative number of serving cell/PDCCH monitoring occasion pair(s) up to the current serving cell and current PDCCH monitoring occasion, first in increasing order of serving cell index and then in increasing order of PDCCH monitoring occasion index. The DAI may be used by UE 115-*a* to determine the ACK and/or NACK payload size when UE 115-*a* sends feedback on a physical uplink control channel (PUCCH). Additionally, slots scheduled to carry PUSCH and containing ACKs may have the ACKs multiplexed with the PUSCH.

Each downlink grant may indicate when its corresponding ACK should be transmitted (e.g., via an offset). Further, the downlink grant may use a counter DAI to denote how many ACKs have been scheduled at that particular slot. For example, a first downlink grant may indicate that its ACK should be transmitted at a slot $\alpha$ and its counter DAI may be set at a value that reflects this indication (e.g., 0). Later, a second downlink grant may indicate that its ACK should also be sent at a slot $\alpha$ and its counter DAI may be incremented from the counter DAI value of the first downlink grant (e.g., 1). A third downlink grant may indicate that its ACK should be transmitted at a slot $\beta$, which is at a time later than $\alpha$, and its counter DAI may be set to a value reflecting this indication (e.g., 0).

In some implementations, a downlink grant, (single-TTI or multi-TTI) following a previous multi-TTI downlink grant, may account for all the TTIs in the previous multi-TTI grant while computing (e.g., incrementing) its total and counter DAI. UE 115-*a* which receives a multi-TTI downlink grant when computing a DAI for each TTI in the multi-TTI grant may consider all the previous TTIs in the multi-TTI grant.

In some cases, a DAI field in a uplink grant (e.g., a PUSCH grant) may include a first DAI and a second DAI. The first DAI may have 1 or 2 bits. 1 bit may be used in the case where there is a semi-static HARQ-ACK codebook and 2 bits may be used in the case where there is a dynamic HARQ-ACK codebook with a single HARQ-ACK codebook. The second DAI may have 0 or 2 bits. 2 bits may be used for a dynamic HARQ-ACK codebook with two HARQ-ACK sub-codebooks and may be 0 otherwise. The DAI may be used by UE 115-*a* to determine how many ACKs are to be multiplexed along with the PUSCH specified by the uplink grant. UE 115-*a* may determine the number of bits to send for ACK and/or NACK through a PDCCH transmission (e.g., DCI). However, including this information in a PUSCH grant (e.g., a multi-TTI grant) may help prevent or mitigate issues caused by missed and false PDCCH transmissions. The number of ACKs to be transmitted may change across different uplink slots, meaning that the DAI value may change from TTI to TTI (or TB to TB) in a multi-TTI grant. If no uplink resources are indicated for an uplink slot, then UE 115-*a* may transmit ACKs (e.g., ACKs indicated by a DAI) via the PUCCH.

Different uplink slots may have a different number of multiplexed ACK bits and, as such, multi-TTI uplink grants may accommodate this through various techniques. In one example, a multi-TTI grant may not include DAI. In such a case, any uplink slots that carry PUSCH and an ACK may utilize single TTI grants (e.g., conventional uplink grants). Additionally or alternatively, UE 115-*a* may deduce total DAI value from a downlink grant ACK delay (e.g., K1) and DAI values from downlink grants. In a second example, a multi-TTI grant may include a DAI for each slot it grants. For instance, if the multi-TTI grant 210 allocates resources for 4 slots, the multi-TTI grant may send 4 DAIS to indicate that 2 ACKs are to be transmitted in the first slot, 1 ACK in the second, no ACKs in the third, and 3 ACKs in the fourth. In a third example, a multi-TTI grant 210 may include DAI for only one of the uplink slots it grants. In some cases, this slot may be the first slot for which the grant applies. In other cases, this slot may be an indicated slot within the set of slots for which the grant applies. In a fourth example, a multi-TTI grant may include DAI for a subset of the slots it grants. In some cases, the multi-TTI grant may only contain DAI for the first M slots. The other slots may be assumed by UE 115-*a* to not contain ACKs. In other cases, a bitmap may indicate the slots that contain ACKs and the multi-TTI may provide DAI values for these slots. In other aspects, the multi-TTI grant 210 may provide a list of slots and their corresponding DAI, which may operate similarly to a lookup table.

In a fifth example, an extended grant may indicate the total DAI of the uplink slots where ACKs are multiplexed with PUSCH. In a sixth example, the multi-TTI grant may define a pattern or mathematical function for the number of ACKs transmitted in each uplink slot. For instance, if a uplink control burst contains 10 slots, the first 5 slots may have a DAI equal to 3 and the last 5 may have a DAI equal to 1. In this case, a multi-TTI message may indicate this pattern without listing out the DAI for each TTI. In a seventh example, a multi-TTI grant may override the value of DAI for a specific slot or set of slots granted by a previous multi-TTI grant or other previous grants. In an eighth example, a single DAI value may be specified in the multi-TTI grant which may be used for all slots granted by the multi-TTI grant (e.g., a multi-TTI grant may specify a DAI value of 0 which may indicate that all uplink slots granted by the multi-TTI grant should transmit 1 ACK). In a ninth example, a multi-TTI downlink grant may indicate that UE 115-*a* should increment the DAI for each slot (or TTI) specified by the multi-TTI grant. This may be useful in cases where there may only be one PDCCH for each multi-TTI downlink grant and corresponding downlink TTIs or slots. For example, a multi-TTI downlink grant may allocate resources for 4 downlink slots and the multi-TTI downlink grant may indicate to a receiving UE 115-*a* that the DAI should be incremented by 4 to account for each slot.

In some cases, LBT may fail and the ACKs scheduled to be multiplexed with PUSCH during the following TTIs may be missed. In some cases, these ACKs may be dropped, while in other cases, the ACKs may be shifted or delayed until LBT passes and then the skipped ACKs may be transmitted. Such shifting may be limited to the slot before the first PUSCH slot with a configured ACK resource. If the delays are extended long enough and uplink TTIs are required to be reduced (e.g., due to a maximum channel occupancy time (MCOT) limit), the last few ACKs may be dropped. In another example, mini-slots may be introduced. In some cases, upon LBT success, the ACKs previously scheduled to be transmitted in a slot may be multiplexed and transmitted in a mini-slot. In other cases, the ACKs previously scheduled to be transmitted in a slot may be delayed after mini-slot LBT until the start of a regular slot. Shifting in the case of using mini-slots may be limited to the slot before the first mini-slot or full slot where ACK resources are configured.

Figure 3:
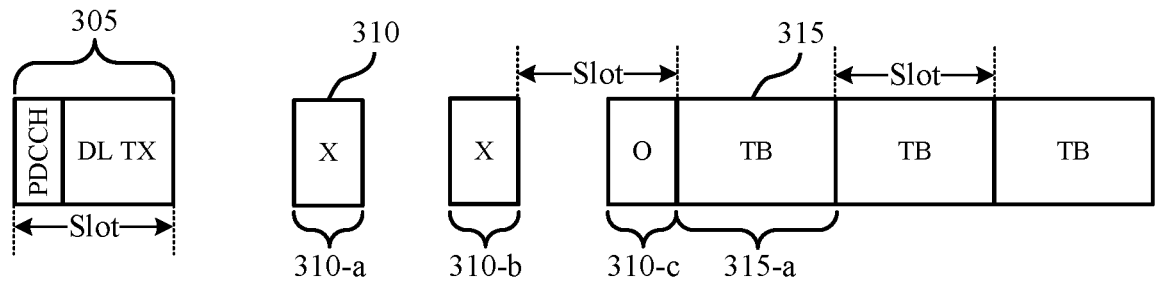
FIG. 3 illustrates an example of a grant procedure that supports techniques for base and extended grants in accordance with aspects of the present disclosure.

FIG. 3 illustrates an example of a grant procedure 300 that supports techniques for base and extended grants in accordance with aspects of the present disclosure. In some examples, grant procedure 300 may be a single-DCI multi-TTI grant procedure implemented by aspects of wireless communications systems 100 or 200.

The grant procedure 300 may include a single-DCI multi-TTI grant 305. Single-DCI multi-TTI grant 305 may allocate resources for a set of TBs 315 and may span a single slot. Single-DCI multi-TTI grant 305 may be an uplink grant and may be included in a PDCCH transmitted from a base station 105 to a UE 115. Single-DCI multi-TTI grant 305 may contain one or two bits per TB for RVID and one or two bits per TB for NDI. The number of bits for RVID and NDI per TB may be fixed for each HARQ procedure.

In some examples, the length of single-DCI multi-TTI grant 305 may be a standard uplink grant (e.g., due to allocating some bits of a resource allocation field for these parameters). Grant procedure 300 may also include one or more LBT attempts 310. In some cases, single-DCI multi-TTI grant 305 may indicate that LBT may be performed prior to certain slots. In other cases, LBT may be performed prior to every slot allocated by single-DCI multi-TTI grant 305. In some instances, LBT attempts 310 may fail. For example, in the case of LBT attempts 310-*a* and 310-*b*, LBT has failed and therefore the device performing LBT (e.g., UE 115 or base station 105) may not gain access to the medium. If an LBT attempt succeeds (e.g., 310-*a*), all TBs 315 allocated resources by single-DCI multi-TTI grant 305 may be transmitted, as shown.

In some cases, first TB 315-*a* may be transmitted during a TTI (e.g., a slot, mini-slot) that has one or more ACKs scheduled for transmission. In this case, ACKs scheduled to be transmitted in slots prior to TB 315-*a* when LBT has failed may be dropped. In other cases, first TB 315-*a* may include ACKs scheduled to be transmitted at slots prior to TB 315-*a*, which may have not been transmitted due to failed LBT attempts 310-*a* and 310-*b*.

Figure 4A:
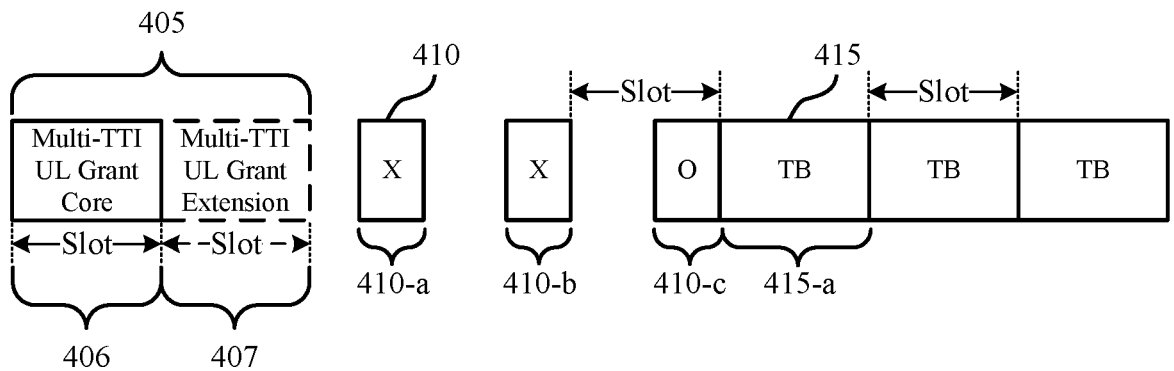
FIGS. 4A and 4B illustrate example grant procedures that support techniques for base and extended grants in accordance with aspects of the present disclosure.

FIG. 4A illustrates an example of a grant procedure 400 that supports techniques for base and extended grants in accordance with aspects of the present disclosure. In some examples, grant procedure 400 may be implemented aspects of wireless communications systems 100 or 200. In some examples, grant procedure 400 may be a multi-TTI uplink grant procedure.

Grant procedure 400 may include a multi-TTI uplink grant 405. Multi-TTI uplink grant 405 may allocate resources for a set of TBs 415. Multi-TTI uplink grant 405 may include multi-TTI uplink grant core 406 and, in some cases, may also include multi-TTI uplink grant extension 407. Multi-TTI uplink grant core 406 may span a single slot and may include a base grant (e.g., a DCI) and, in some cases, may include one or more extended grants (e.g. one or more additional DCIs). In other cases (e.g., due to there not being enough resources to transmit the base grant and all of its corresponding extended grants in a single slot), there may also be a multi-TTI uplink grant extension 407 that may not be in the same slot as multi-TTI uplink grant core 406 and may span a single slot. Multi-TTI uplink grant extension 407 may include one or more extended grants not included in multi-TTI uplink grant core 406 (e.g., due to there not being enough resources in multi-TTI uplink grant core 406).

Although only one multi-TTI uplink grant extension 407 is depicted, other implementations may include multiple extensions. In some cases, the base grant may be a standard uplink grant and the one or more extended grants may include information that varies among the set of TBs 415. In other cases, the information may be split among the base grant and its extended grants in other configurations (e.g., some parameters that vary from TB to TB may be fit into multi-TTI uplink grant core 406 and parameters associated with a conventional uplink grant may be put in an extended grant). It should be noted that there may be implementations where multi-TTI uplink grant extension 407 is not used (e.g., multi-TTI uplink grant core 406 has enough resources for the base grant and all of its extended grants).

Grant procedure 400 may also include LBT attempts 410. In some cases, multi-TTI uplink grant 405 may indicate that LBT may be performed prior to certain slots. In other cases, LBT may be performed prior to every slot allocated by multi-TTI uplink grant 405. In some cases, LBT attempts 410 may not initially succeed (e.g., LBT attempt 410-*a* and 410-*b*). If LBT attempt 410-*a* succeeds, all TBs allocated resources by multi-TTI uplink grant 405 may be transmitted.

Grant procedure 400 may also include TBs 415. Once an LBT attempt succeeds (e.g., LBT attempt 410-*c*), then TBs 415 may be transmitted. In some cases, first TB 415-*a* may include ACKs scheduled to be transmitted at TB 415-*a*. In this case, ACKs scheduled to be transmitted in slots prior to TB 415-*a* may be dropped. In other cases, first TB 415-*a* may include ACKs scheduled to be transmitted at slots prior to TB 415-*a*, which may have not been transmitted due to failed LBT attempts (e.g., 410-*a* and 410-*b*).

Figure 4B:
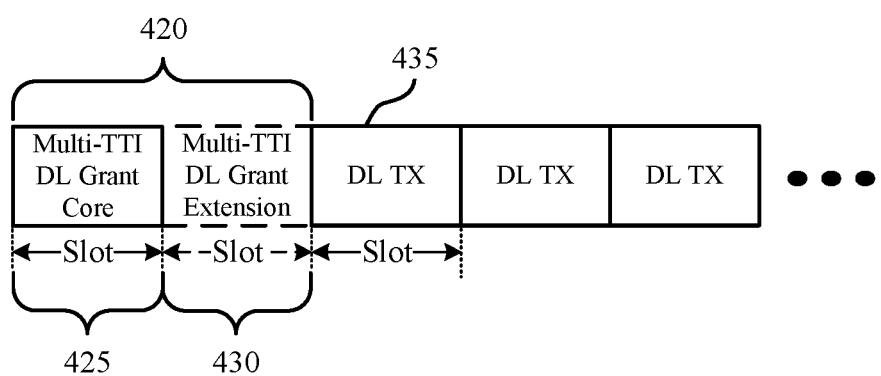

FIG. 4B illustrates an example of a grant procedure 401 in accordance with aspects of the present disclosure. In some examples, grant procedure 401 may be a multi-TTI downlink grant procedure and may be implemented by aspects of wireless communications systems 100 or 200.

Grant procedure 401 may include a multi-TTI downlink grant 420. Multi-TTI downlink grant 420 may allocate resources for a set of downlink transmissions 435. Multi-TTI downlink grant 420 may include multi-TTI downlink grant core 425 and, in some cases, may also include multi-TTI downlink grant extension 430. Multi-TTI downlink grant core 425 may span a single slot and may include a base grant (e.g., a DCI). In some aspects, multi-TTI downlink grant core 425 may include one or more extended grants (e.g. one or more additional DCIs). In other cases (e.g., due to there not being enough resources to transmit the base grant and all of its corresponding extension grants in a single slot), there may also be a multi-TTI downlink grant extension 430 that may not be in the same slot as multi-TTI downlink grant core 425 and may span a single slot. Multi-TTI downlink grant extension 430 may include one or more extended grants not included in multi-TTI downlink grant core 425 (e.g., due to there not being enough resources in multi-TTI downlink grant core 425). Although only one multi-TTI downlink grant extension 430 is depicted, other implementations may use multiple extensions. It should be noted that there may be implementations where multi-TTI downlink grant extension 430 is not used (e.g., multi-TTI downlink grant core 425 has enough resources for the base grant and all of its extended grants). Although downlink transmissions 435 are depicted as occurring right after multi-TTI downlink grant 420, there may be cases where downlink transmissions 435 are transmitted starting at a certain number of slots after multi-TTI downlink grant 420 is finished being transmitted.

Figure 5:
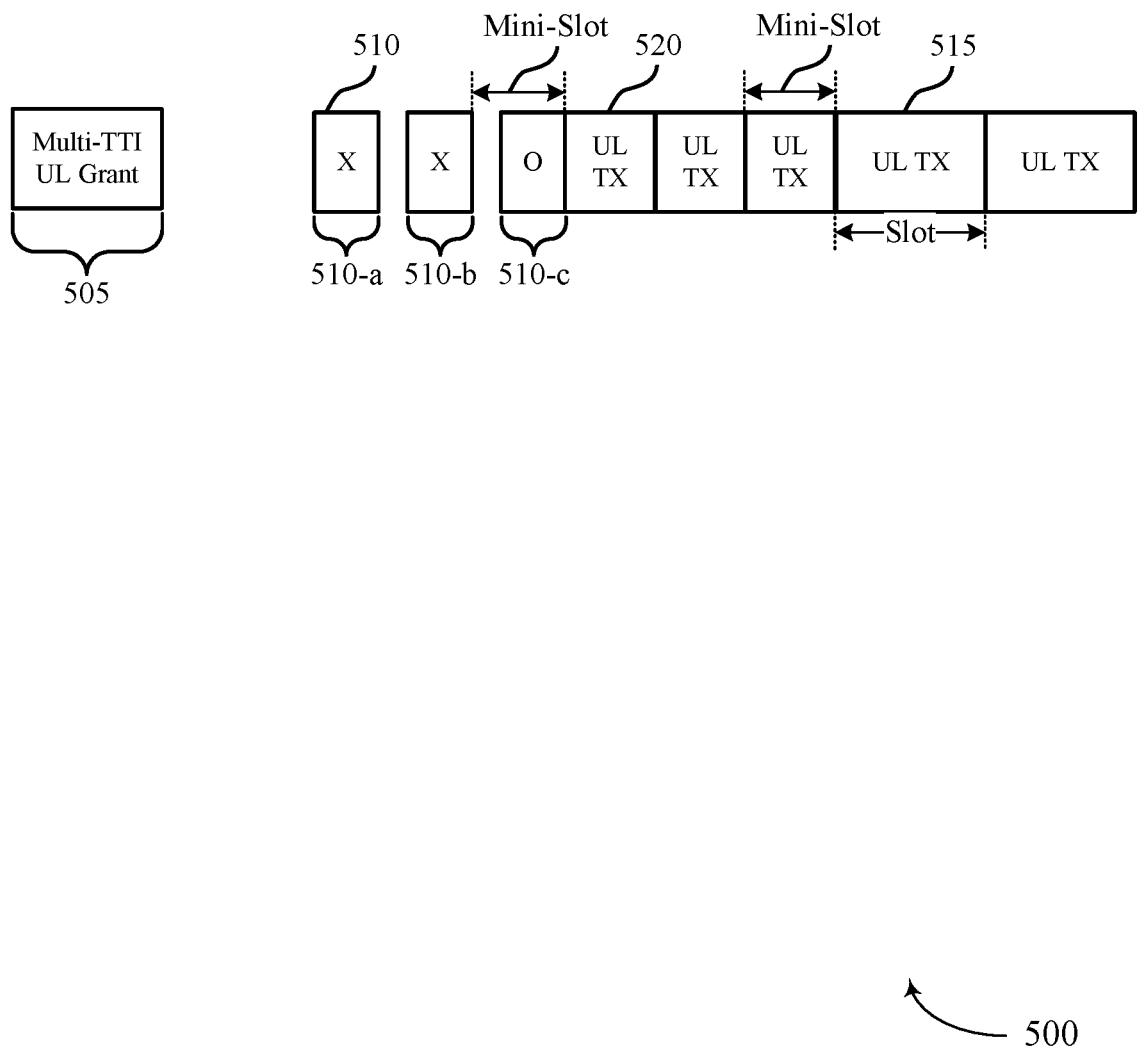
FIG. 5 illustrates an example of a grant procedure that supports techniques for base and extended grants in accordance with aspects of the present disclosure.

FIG. 5 illustrates an example of a grant procedure 500 that supports techniques for base and extended grants in accordance with aspects of the present disclosure. In some examples, grant procedure 500 may be implemented by aspects of wireless communications systems 100 or 200.

Multi-TTI uplink grant 505 may implement aspects of single-DCI multi-TTI grant 305 or multi-TTI uplink grant 405. In addition, multi-TTI uplink grant 505 may include information related to the utilization of mini-slots and full-slots. For example, multi-TTI uplink grant 505 may include the number of times a UE 115 may attempt LBT with mini-slots before switching to performing LBT with full-slots and/or a maximum number of mini-slots that may be used to transmit uplink transmissions 520 (e.g., ACKs and/or TBs) before switching to transmitting uplink transmissions 515 (e.g., TBs) with full slots.

Grant procedure 500 may also include LBT attempts 510. If mini-slots are configured (e.g., by multi-TTI uplink grant 505), there may be LBT attempts 510 within or prior to a number of mini-slots up to the maximum number of mini-slots that may be used. For example, LBT attempts 510-*a* and 510-*b* may be performed prior to a first and second mini-slot and may fail. LBT attempt 510-*c* may succeed and uplink transmissions 520 may begin being transmitted. In this example, if the number of mini-slots in which LBT could be performed was less than 3, then LBT attempt 510-*c* may have been performed within a full slot.

Uplink transmissions 515 may be transmitted after a number of uplink transmissions 520 are transmitted. In some cases, no uplink transmissions 520 may be transmitted and uplink transmissions 515 may be transmitted after LBT attempts 510 prior to or within a mini-slot succeeds.

Uplink transmissions 520 may be transmitted for a number of frames dictated by the maximum number of mini-slots for transmitting uplink transmissions 520 denoted by multi-TTI uplink grant. Alternatively, uplink transmissions 520 may be transmitted up to the next full slot boundary. In some aspects, uplink transmissions 520 may contain ACKs for one or more downlink transmissions and may span a mini-slot.

Figure 6:
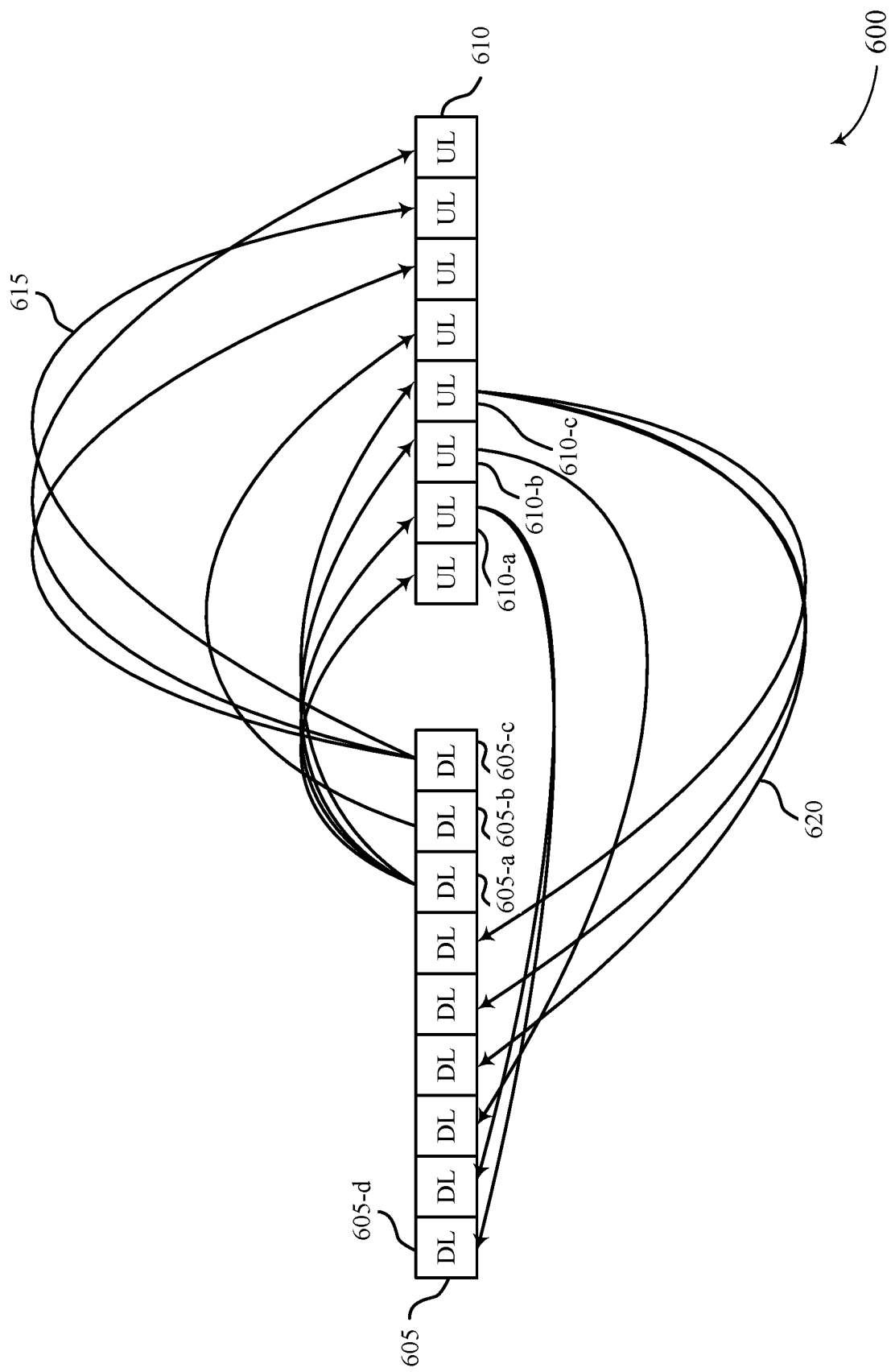
FIG. 6 illustrates an example of a multi-TTI grant feedback scheme that supports techniques for base and extended grants in accordance with aspects of the present disclosure.

FIG. 6 illustrates an example of a multi-TTI grant feedback scheme 600 that supports techniques for base and extended grants in accordance with aspects of the present disclosure. In some examples, multi-TTI grant feedback scheme 600 may be implemented by aspects of wireless communications systems 100 or 200. Multi-TTI grant feedback scheme 600 may include downlink slots 605, uplink slots 610, total DAI indications 615, and ACKs 620.

Downlink slots 605 may contain, for example, downlink grants and/or uplink grants. In some cases, downlink grants may provide counter DAI indications, but may not provide total DAI indications (e.g., the downlink transmission in downlink slot 605-*d*). In some cases, uplink grants (e.g., the downlink transmissions in downlink slots 605-*a*, 605-*b*, and 605-*c*) may provide total DAI indications 615. The downlink transmissions in downlink slots 605-*a* and 605-*c* may be multi-TTI uplink grants and 605-*b* may be a single-TTI uplink grant. In this example, downlink slot 605-*a* allocates 4 uplink slots 610, downlink slot 605-*b* allocates 1 uplink slot 610, and downlink slot 605-*c* allocates 3 uplink slots 610. A multi-TTI grant may contain a total DAI value corresponding to the number of ACKs to be transmitted for each uplink slot 610 it grants. For example, downlink slot 605-*a* may contain a multi-TTI uplink grant that indicates that the first uplink slot should not transmit any ACKs (e.g., no DAI), uplink slot 610-*a* should transmit 2 ACKs (e.g., DAI=1), uplink slot 610-*b* should transmit 1 ACK (e.g., DAI=0), and uplink slot 610-*c* should transmit 3 ACKs (e.g., DAI=2). The multi-TTI grant may have values corresponding to the total DAI listed in order of uplink slot (e.g., in a list) or may otherwise specify a subset of slots (or TTIs) that contain DAI (e.g., a bitmap) and the values of DAI for these slots.

Uplink slots 610 may contain, for example, TB blocks. Such TBs may contain ACKs 620 corresponding to particular downlink slots. For instance, uplink slot 610-*a* may contain 2 ACKs 620 corresponding to the first two downlink slots, uplink slot 610-*b* may contain 1 ACK 620 corresponding to the next uplink slot, and uplink slot 610-*c* may contain 3 ACKs 620 corresponding to the next 3 downlink slots. In some cases, the number of ACKs transmitted in uplink slots 610-*a*, 610-*b*, and 610-*c* may depend on the total DAI values indicated by a multi-TTI grant or single-TTI grant. In other cases, the total DAI value may be indicated by the counter values or total DAI values of downlink grants within downlink slots 605. If a multi-TTI grant indicates PUSCH resources in a particular uplink slot 610, then the corresponding ACKs 620 may be multiplexed with a PUSCH. In other cases, the corresponding ACKs may be transmitted on a PUCCH.

Figure 7:
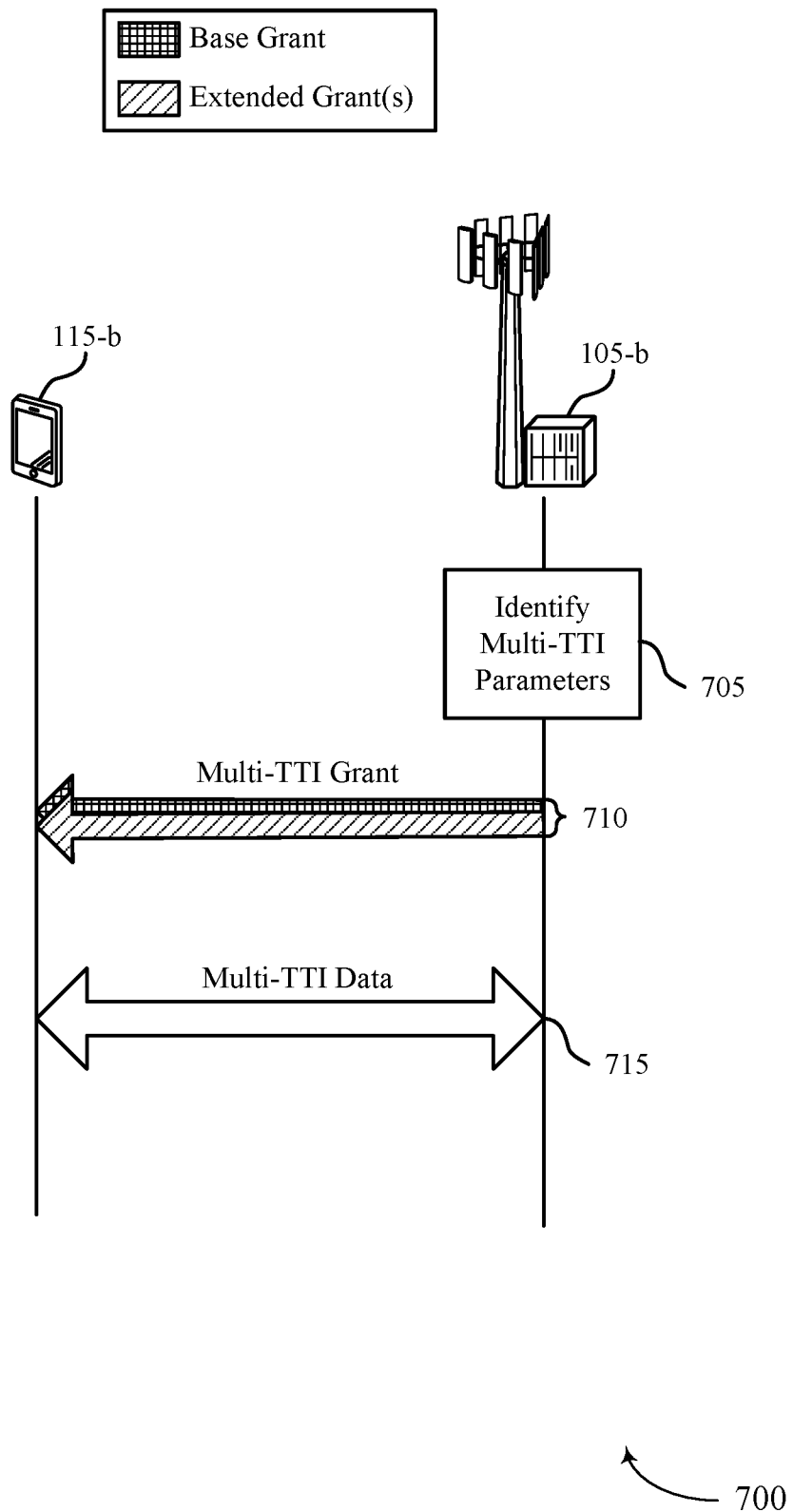
FIG. 7 illustrates an example of a process flow that supports techniques for base and extended grants in accordance with aspects of the present disclosure.

FIG. 7 illustrates an example of a process flow 700 that supports techniques for base and extended grants in accordance with aspects of the present disclosure. In some examples, process flow 700 may implement aspects of wireless communications systems 100 or 200. Process flow 700 includes base station 105-*b* and UE 115-*b*, which may be examples of the corresponding devices as described with reference to FIGS. 1 and 2.

At 705, base station 105-*b* may identify a set of parameters (MIMO configuration, resource allocation, etc.) for transmission of data via a shared channel (e.g., PUSCH or PDSCH) over multiple TTIs.

At 710, base station 105-*b* may transmit a multi-TTI grant. The multi-TTI grant may include a base grant and one or more extended grants. The base grant and the one or more extended grants may each include one or more parameters. In some cases, the base grant and one or more extended grants may each include DCI. The base grant may be a conventional uplink or downlink grant and the extended grants may contain additional information (e.g., CBG level transmission information, full NDI, total DAI, HARQ DAI, RA, mini and full-slot configuration information, CCA occasion, etc. for multiple TTIs). Some of the information included in the extended grant may not be included in the base grant. In some cases, information may be split among the base grant the one or more extended grants.

In some aspects, the base grant and at least a portion of the set of extended grants may be transmitted in the same slot. In such instances, any extended grants not transmitted in the same slot as the base grant may be transmitted in other slots. In other cases, a base grant may be transmitted in one slot and the one or more extended grants may be transmitted in one or more other slots.

UE 115-*b* may receive the base grant and the one or more extended grants and may determine resources for communication. For instance, UE 115-*b* may determine a set of time-frequency resources for an uplink transmission or UE 115-*b* may determine a set of time-frequency resource to monitor for a downlink transmission.

At 715, multi-TTI data may be communicated. If the multi-TTI grant transmitted at 710 is an uplink grant, then UE 115-*b* may transmit uplink data over multiple TTIs, which may be received by base station 105-*b*. In some cases, uplink data may be transmitted over a PUSCH. If the multi-TTI grant transmitted at 710 is a downlink grant, then base station 105-*b* may transmit downlink data over multiple TTIs, which may be received by UE 115-*b*. In some cases, downlink data may be transmitted over a PDSCH.

Figure 8:
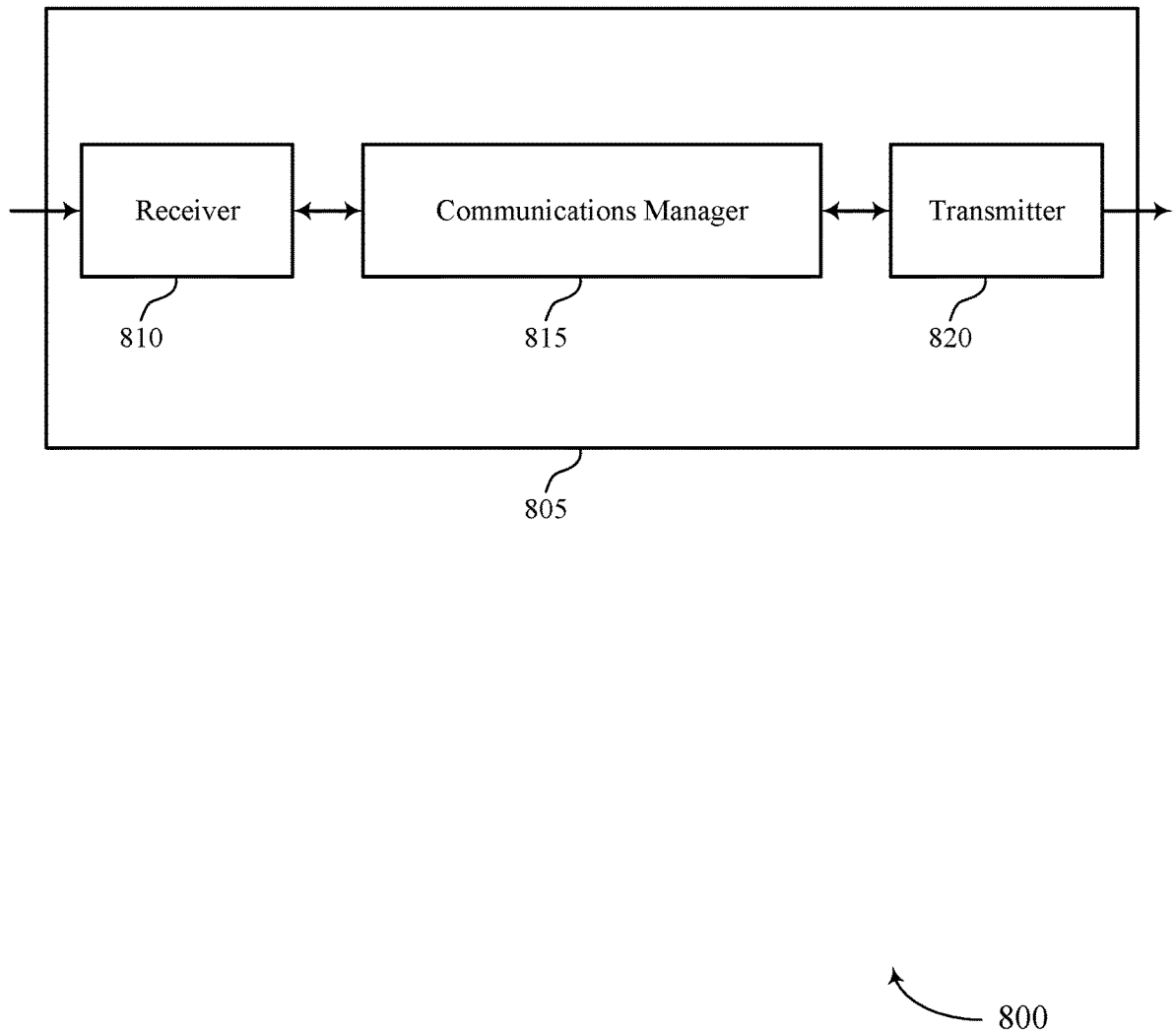
FIGS. 8 and 9 show block diagrams of devices that support techniques for base and extended grants in accordance with aspects of the present disclosure.

FIG. 8 shows a block diagram 800 of a device 805 that supports techniques for base and extended grants in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for base and extended grants, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters and communicate with the base station 105 in accordance with the first and second subsets of parameters. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an ASIC, a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
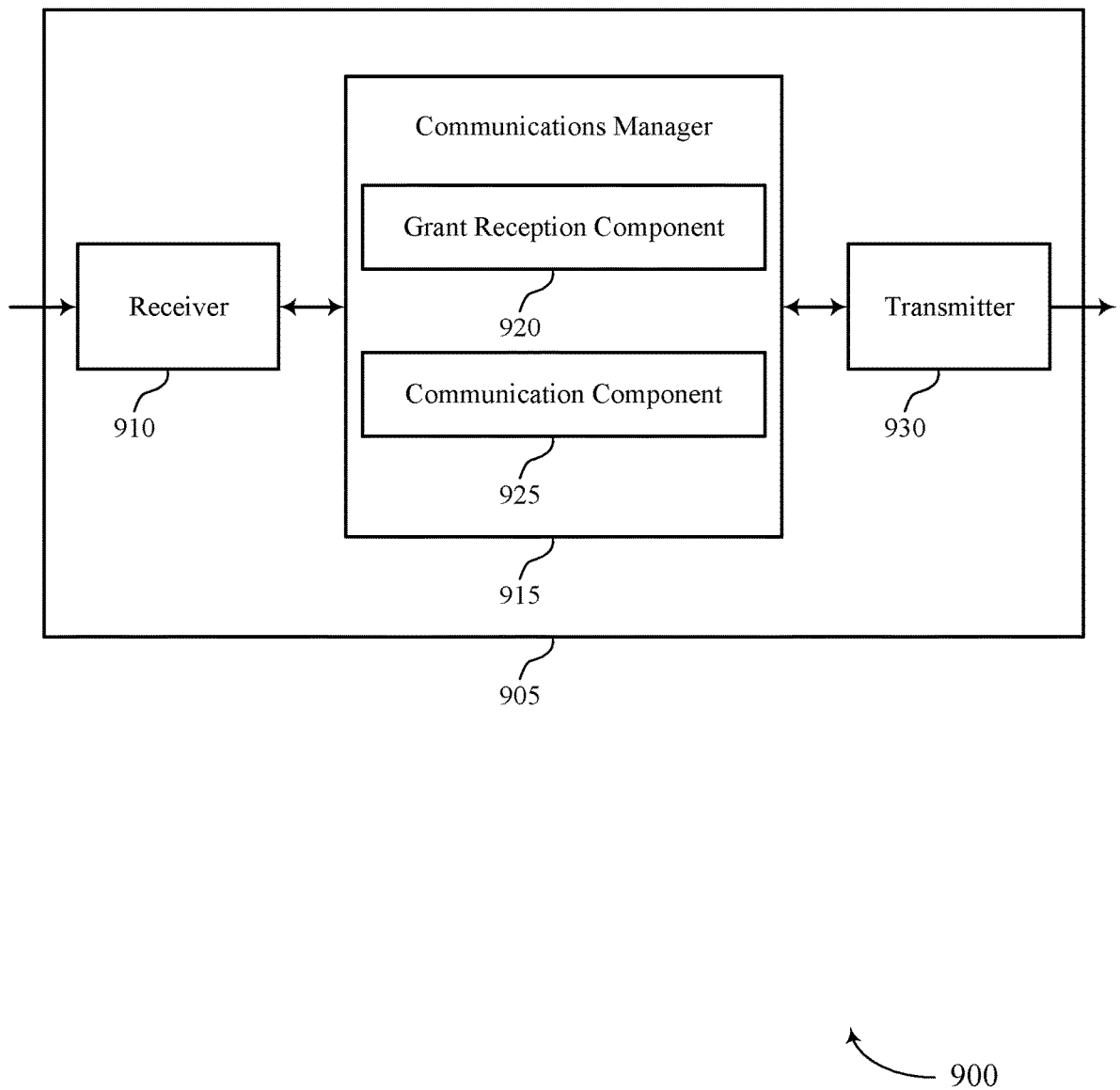

FIG. 9 shows a block diagram 900 of a device 905 that supports techniques for base and extended grants in accordance with aspects of the present disclosure. The device 905 may be an example of aspects of a device 805 or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to techniques for base and extended grants, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a grant reception component 920 and a communication component 925. The communications manager 915 may be an example of aspects of the communications manager 1110 described herein.

The grant reception component 920 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters.

The communication component 925 may communicate with the base station 105 in accordance with the first and second subsets of parameters.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
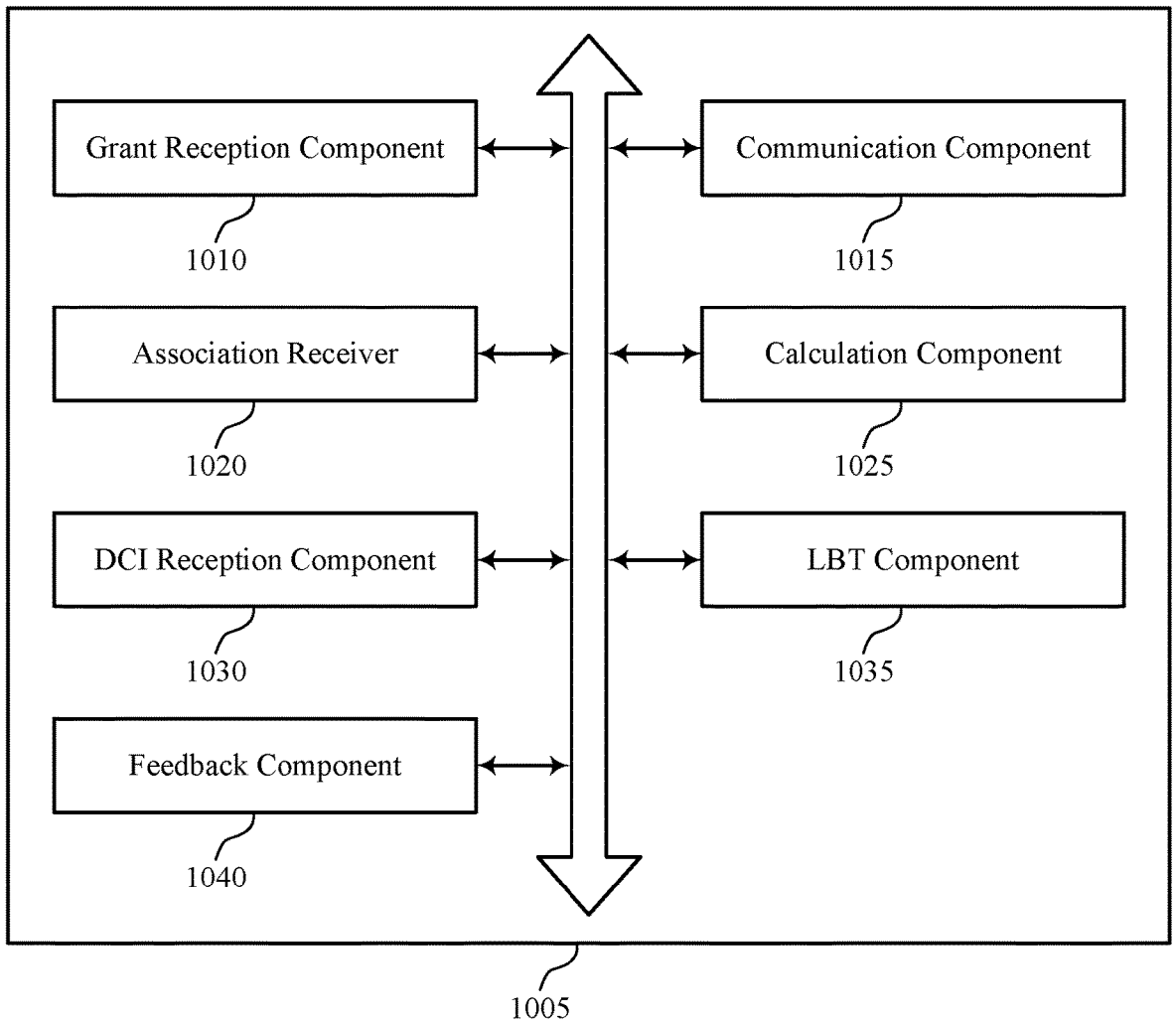
FIG. 10 shows a block diagram of a communications manager that supports techniques for base and extended grants in accordance with aspects of the present disclosure.

FIG. 10 shows a block diagram 1000 of a communications manager 1005 that supports techniques for base and extended grants in accordance with aspects of the present disclosure. The communications manager 1005 may be an example of aspects of a communications manager 815, a communications manager 915, or a communications manager 1110 described herein. The communications manager 1005 may include a grant reception component 1010, a communication component 1015, an association receiver 1020, a calculation component 1025, a DCI reception component 1030, a LBT component 1035, a feedback component 1040, and a feedback component 1045. Each of these modules may communicate, directly or indirectly, with one another (e.g., via one or more buses).

The grant reception component 1010 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters.

In some examples, the grant reception component 1010 may receive, from the base station 105, an indication of a grant type for the base grant or the extended grant. In some cases, the grant reception component 1010 may receive the base grant according to a first RNTI. In some aspects, the grant reception component 1010 may receive the extended grant according to a second RNTI different from the first RNTI. In some instances, the grant reception component 1010 may receive a subsequent grant including a second DAI for the at least one TTI, where the second DAI of the subsequent grant overrides the DAI of the multi-TTI grant. In some cases, the indication is included in a multi-TTI grant and includes a set of bits that indicate the grant type. In some cases, the multi-TTI grant indicates a group of parameters that differ between a first TTI and a second TTI of the multiple TTIs.

In some examples, the group of parameters includes CBGLTI, a full NDI, total DAI, a HARQ ID, an RV ID, a resource allocation, mini-slot or full slot configuration information, a CCA occasion, a DCI parameter, a MIMO configuration, or any combination thereof.

In some cases, the multi-TTI grant includes a DAI for a subset of TTIs of the multiple TTIs. In some instances, the multi-TTI grant includes one of multiple DAIS for the subset of TTIs, respective DAIS for each TTI of the multiple TTIs, a set of DAIS for a corresponding set of TTIs of the multiple TTIs and a bitmap indicating the set of TTIs, a TTI pattern for the DAI, a single DAI value for the multiple TTIs, or DAI for a serving cell and monitoring occasion pairing.

In some aspects, a total DAI is included in the extended grant, where the total DAI is associated with a set of TTIs having control information multiplexed with data. In some examples, the multi-TTI is a grant for a downlink shared channel.

The communication component 1015 may communicate with the base station 105 in accordance with the first and second subsets of parameters. In some examples, the communication component 1015 may transmit, to the base station 105, the transmission of data via the shared channel over multiple TTIs in accordance with the base grant and the extended grant. In some cases, the communication component 1015 may receive, from the base station 105, the transmission of data via the shared channel over multiple TTIs in accordance with the base grant and the extended grant.

The association receiver 1020 may receive, from the base station 105, an association between the base grant and the extended grant. In some examples, the association receiver 1020 may receive, in a first TTI, the base grant corresponding to an association ID. In some instances, the association receiver 1020 may receive the extended grant corresponding to the base grant in a second TTI different from the first TTI. In some cases, the base grant and the extended grant are received within the same TTI. In some aspects, the association ID is included in a payload of the base grant, the extended grant, or both. In some instances, the association ID includes a time delta between the base grant and the extended grant.

The calculation component 1025 may calculate a total DAI based on the multiple TTIs subject to the multi-TTI grant (e.g., multi-TTI grant for a downlink shared channel or PDSCH).

The DCI reception component 1030 may receive DCI that indicates a number of mini-slots for CCA, a maximum or minimum number of mini-slots to use before switching to a slot, or a combination thereof. In some examples, DCI reception component 1030 may identify a start location for performing an LBT procedure based on receiving the multi-TTI grant.

The LBT component 1035 may perform a LBT procedure prior to the transmission of data based on the multi-TTI grant. In some examples, the LBT component 1035 may determine whether to transmit data based on a result of the LBT procedure. In some cases, the LBT component 1035 may perform a LBT procedure prior to a start of transmission of the multiple TTIs. In some aspects, the LBT component 1035 may determine whether to transmit the feedback message based on a result of the LBT procedure. In some instances, the LBT component 1035 may determine a failure of the LBT procedure.

The feedback component 1040 may identify a set of TTIs of the multiple TTIs for transmission of a feedback message based on the multi-TTI grant. In some examples, the feedback component 1040 may transmit the feedback message in a subsequent TTI delayed from the TTI. In some examples, the feedback component 1040 may multiplex the feedback message in a mini-slot or a start of a slot based on the failure.

Figure 11:
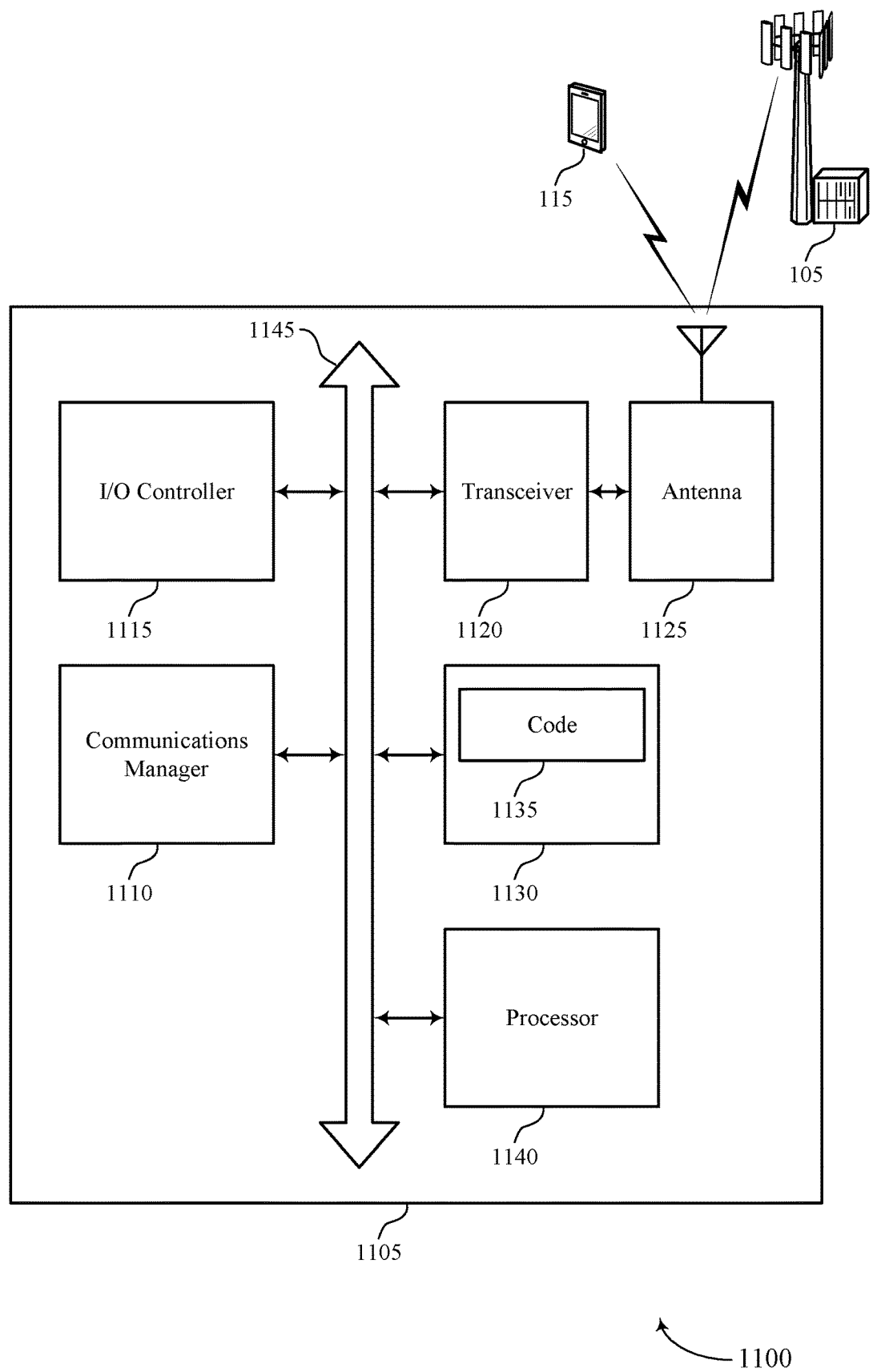
FIG. 11 shows a diagram of a system including a device that supports techniques for base and extended grants in accordance with aspects of the present disclosure.

FIG. 11 shows a diagram of a system 1100 including a device 1105 that supports techniques for base and extended grants in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters and communicate with the base station 105 in accordance with the first and second subsets of parameters.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for base and extended grants).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
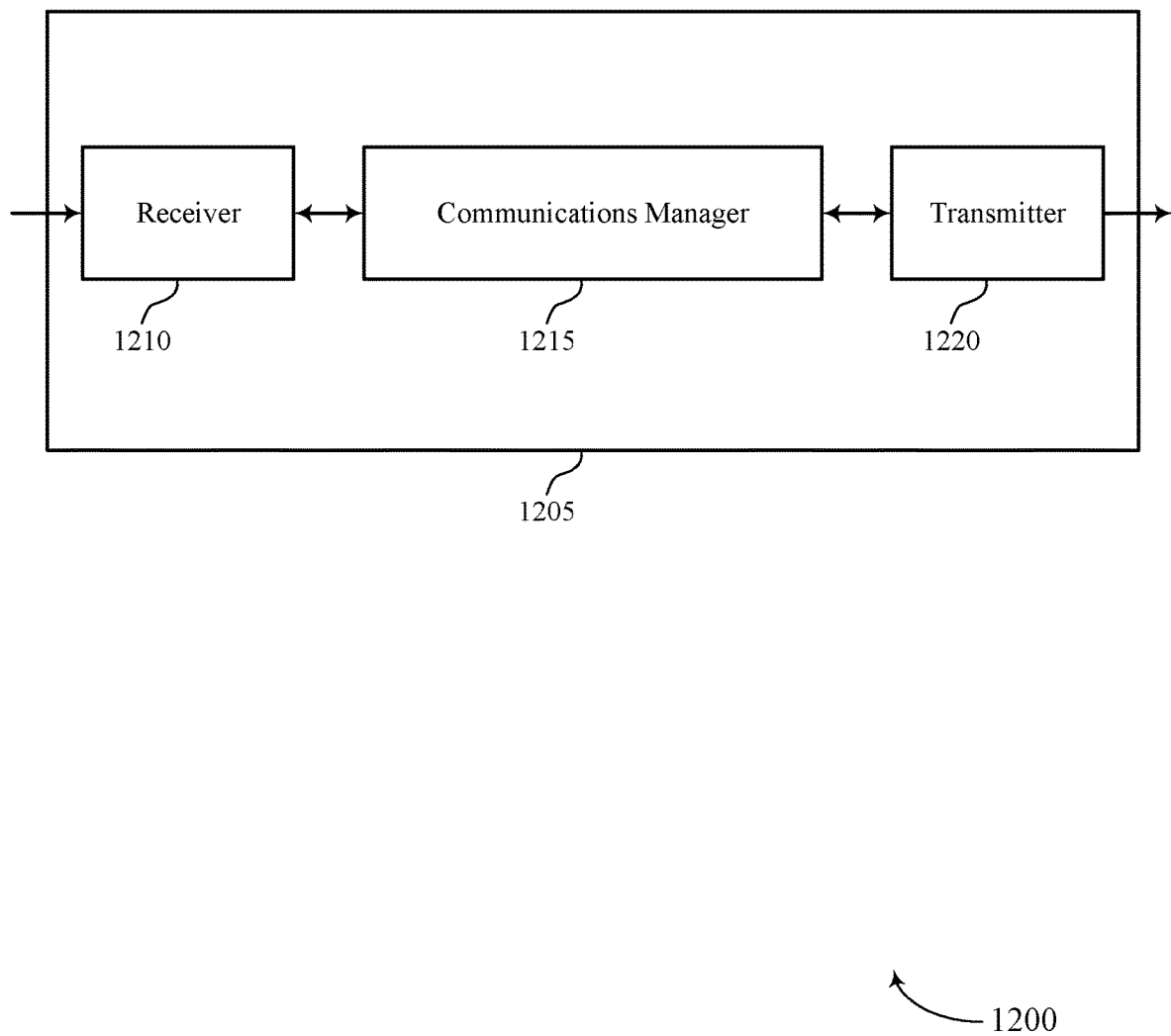
FIGS. 12 and 13 show block diagrams of devices that support techniques for base and extended grants in accordance with aspects of the present disclosure.

FIG. 12 shows a block diagram 1200 of a device 1205 that supports techniques for base and extended grants in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for base and extended grants, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a set of parameters for transmission of data via a shared channel over multiple TTIs, transmit, to a UE 115, a multi-TTI grant including a base grant and an extended grant, where the base grant indicates a first subset of parameters and the extended grant indicates a second subset of parameters, and communicate with the UE 115 in accordance with the first and second subsets of parameters. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
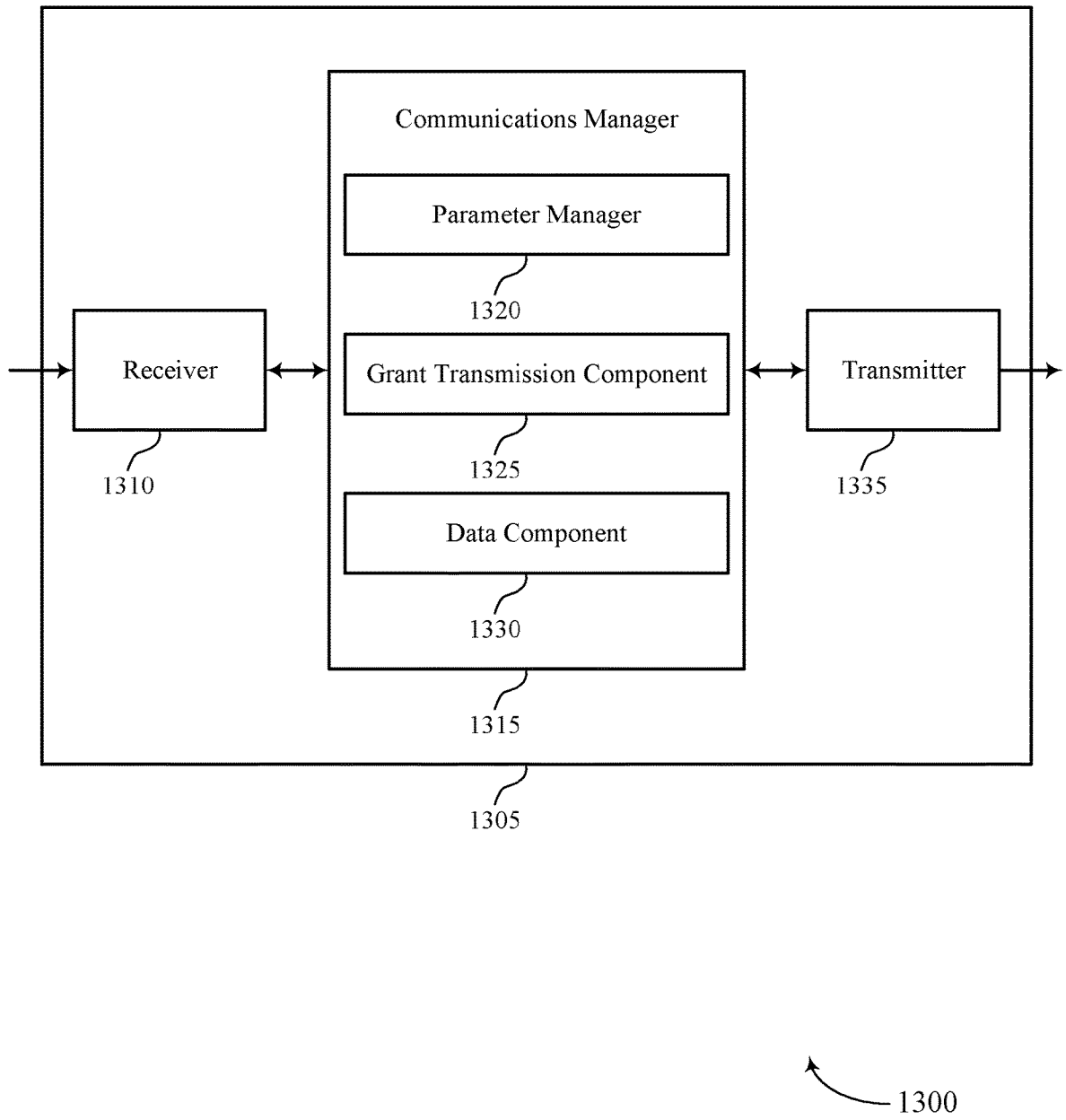

FIG. 13 shows a block diagram 1300 of a device 1305 that supports techniques for base and extended grants in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for base and extended grants, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a parameter manager 1320, a grant transmission component 1325, and a data component 1330. The communications manager 1315 may be an example of aspects of the communications manager 1510 described herein.

The parameter manager 1320 may identify a set of parameters for transmission of data via a shared channel over multiple TTIs.

The grant transmission component 1325 may transmit, to a UE 115, a multi-TTI grant including a base grant and an extended grant, where the base grant indicates a first subset of parameters and the extended grant indicates a second subset of parameters.

The data component 1330 may communicate with the UE 115 in accordance with the first and second subsets of parameters.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
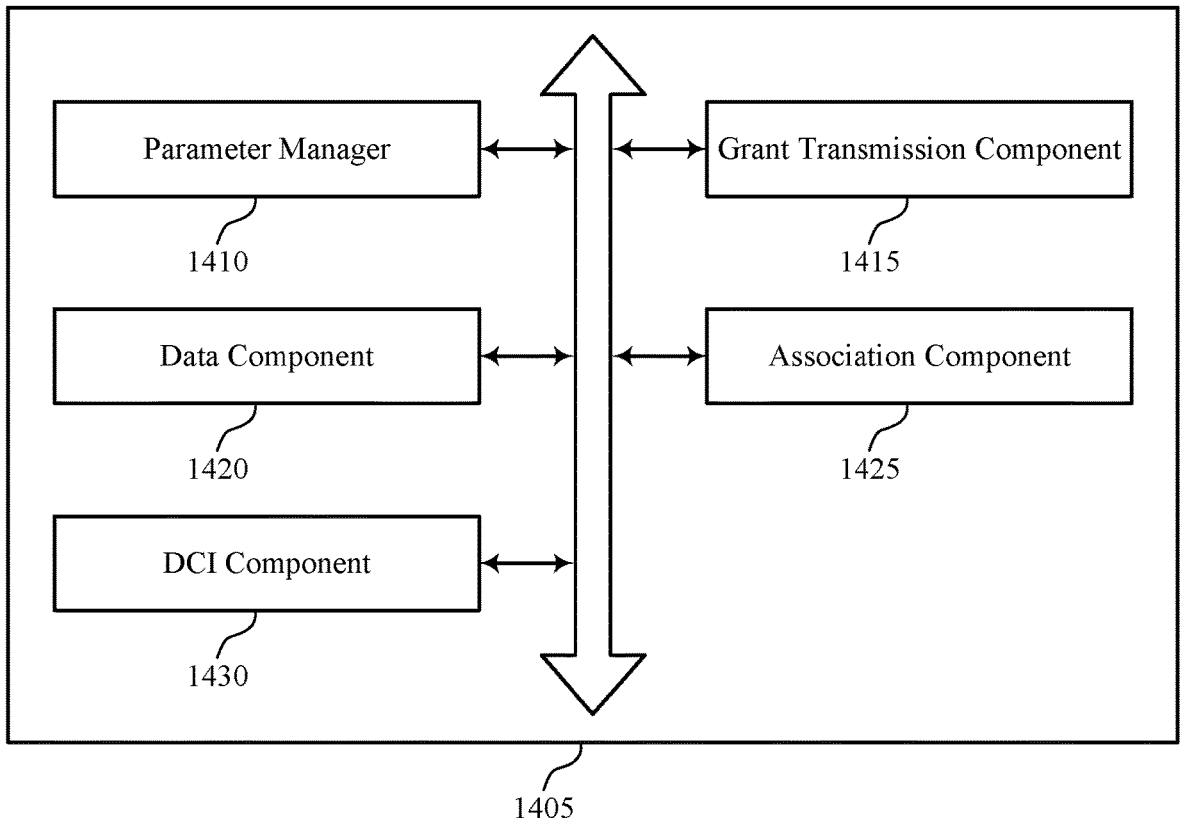
FIG. 14 shows a block diagram of a communications manager that supports techniques for base and extended grants in accordance with aspects of the present disclosure.

FIG. 14 shows a block diagram 1400 of a communications manager 1405 that supports techniques for base and extended grants in accordance with aspects of the present disclosure. The communications manager 1405 may be an example of aspects of a communications manager 1215, a communications manager 1315, or a communications manager 1510 described herein. The communications manager 1405 may include a parameter manager 1410, a grant transmission component 1415, a data component 1420, an association component 1425, and a DCI component 1430. Each of these modules may communicate, directly or indirectly, with one another (e.g., via one or more buses).

The parameter manager 1410 may identify a set of parameters for transmission of data via a shared channel over multiple TTIs.

The grant transmission component 1415 may transmit, to a UE 115, a multi-TTI grant including a base grant and an extended grant, where the base grant indicates a first subset of parameters and the extended grant indicates a second subset of parameters.

In some examples, the grant transmission component 1415 may transmit, to the UE 115, an indication of a grant type for the base grant or the extended grant. In some cases, the grant transmission component 1415 may transmit the base grant according to a first RNTI. In some aspects, the grant transmission component 1415 may transmit the extended grant according to a second RNTI different from the first RNTI. In some instances, the grant transmission component 1415 may transmit a subsequent grant including a second DAI for the at least one TTI, where the second DAI of the subsequent grant overrides the DAI of the multi-TTI grant. In some examples, the grant transmission component 1415 may transmit a downlink grant after the multi-TTI grant, where a DAI of the downlink grant is based on one or more DAIs of the multi-TTI grant. In some cases, the indication is included in a multi-TTI grant and includes a set of bits that indicate the grant type. In some cases, the multi-TTI grant indicates a group of parameters that differ between a first TTI and a second TTI of the multiple TTIs.

In some examples, the group of parameters includes CBGLTI, a full NDI, total DAI, a HARQ ID, an RV ID, a resource allocation, mini-slot or full slot configuration information, a CCA occasion, a DCI parameter, a MIMO configuration, or any combination thereof. In some cases, the multi-TTI grant includes a DAI for a subset of TTIs of the multiple TTIs. In some aspects, the multi-TTI grant includes one of multiple DAIs for the subset of TTIs, respective DAIs for each TTI of the multiple TTIs, a set of DAIs for a corresponding set of TTIs of the multiple TTIs and a bitmap indicating the set of TTIs, a TTI pattern for the DAI, a single DAI value for the multiple TTIs, or DAI for a serving cell and monitoring occasion pairing. In some instances, a total DAI is included in the extended grant, where the total DAI is associated with a set of TTIs having control information multiplexed with data.

The data component 1420 may communicate with the UE 115 in accordance with the first and second subsets of parameters. In some examples, the data component 1420 may receive, from the UE 115, the transmission of data via the shared channel over multiple TTIs in accordance with the base grant and the extended grant. In some cases, the data component 1420 may transmit, to the UE 115, the transmission of data via the shared channel over multiple TTIs in accordance with the base grant and the extended grant.

The association component 1425 may transmit, to the UE 115, an association between the base grant and the extended grant. In some examples, the association component 1425 may transmit, in a first TTI, the base grant corresponding to an association ID. In some cases, the association component 1425 may transmit the extended grant corresponding to the base grant in a second TTI different from the first TTI. In some aspects, the base grant and the extended grant are transmitted within the same TTI. In some instances, the association ID is included in a payload of the base grant, the extended grant, or both. In some examples, the association ID includes a time delta between the base grant and the extended grant.

The DCI component 1430 may transmit DCI that indicates a number of mini-slots for CCA, a maximum or minimum number of mini-slots to use before switching to a slot, or a combination thereof.

Figure 15:
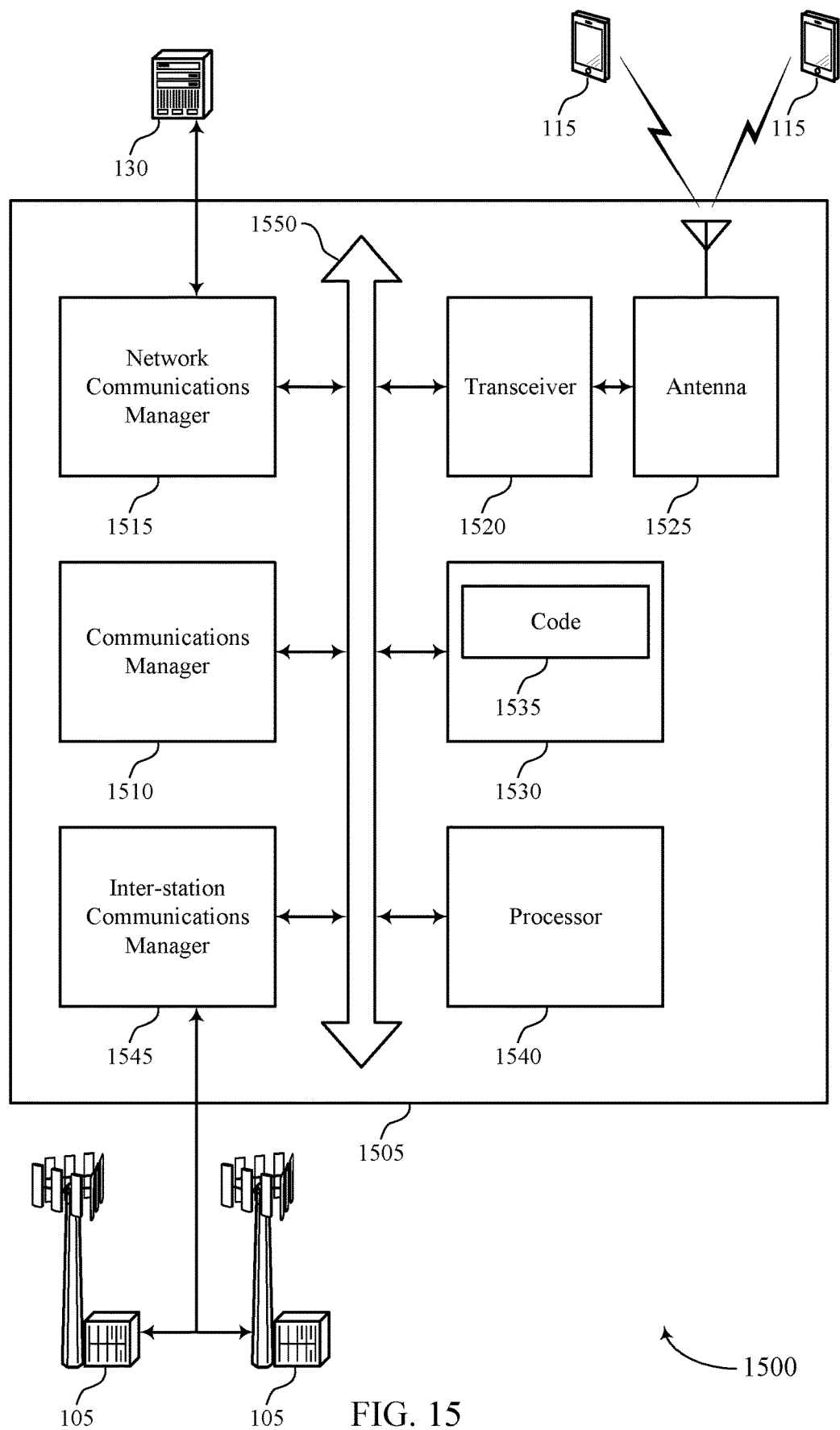
FIG. 15 shows a diagram of a system including a device that supports techniques for base and extended grants in accordance with aspects of the present disclosure.

FIG. 15 shows a diagram of a system 1500 including a device 1505 that supports techniques for base and extended grants in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a set of parameters for transmission of data via a shared channel over multiple TTIs, transmit, to a UE 115, a multi-TTI grant including a base grant and an extended grant, where the base grant indicates a first subset of parameters and the extended grant indicates a second subset of parameters, and communicate with the UE 115 in accordance with the first and second subsets of parameters.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting techniques for base and extended grants).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
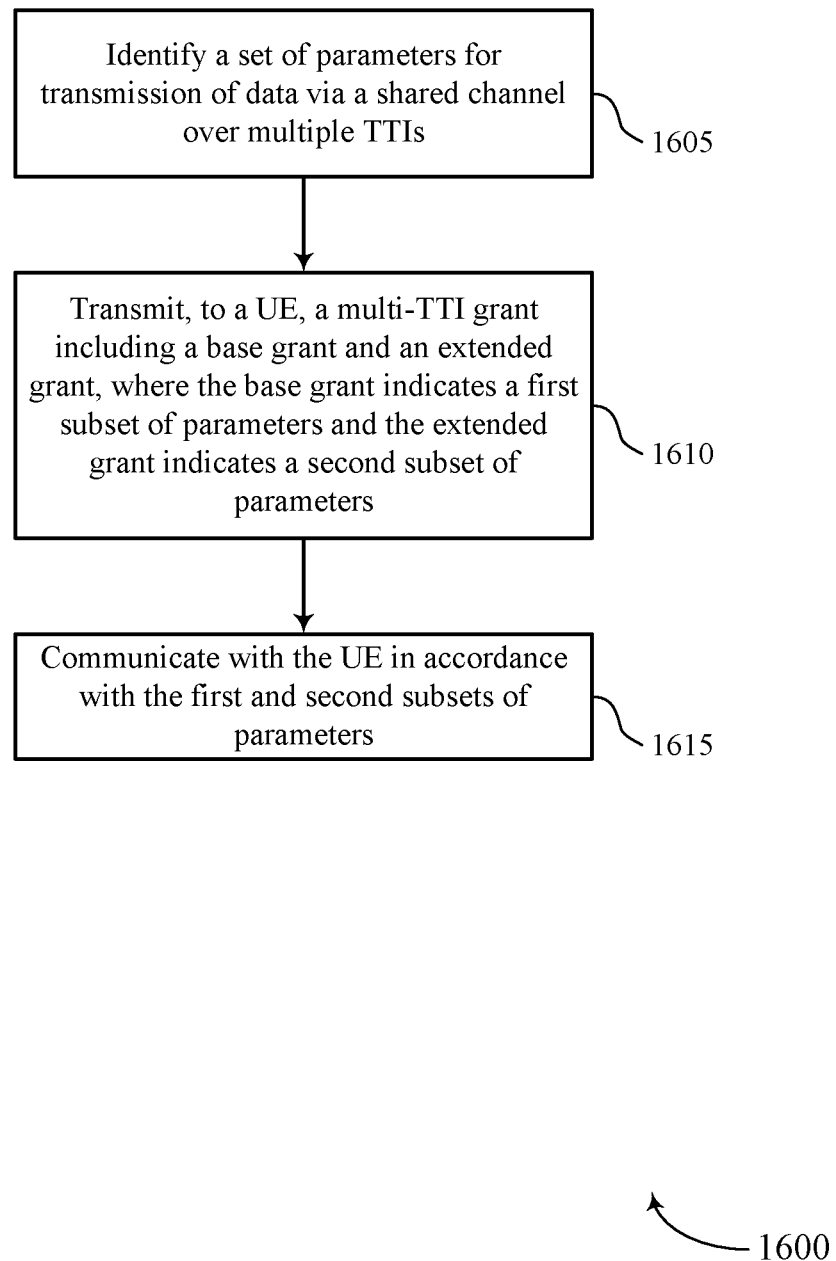
FIGS. 16 through 21 show flowcharts illustrating methods that support techniques for base and extended grants in accordance with aspects of the present disclosure.

FIG. 16 shows a flowchart illustrating a method 1600 that supports techniques for base and extended grants in accordance with aspects of the present disclosure. The operations of method 1600 may be implemented by a base station 105 or its components as described herein. For example, the operations of method 1600 may be performed by a communications manager as described with reference to FIGS. 12 through 15. In some examples, a base station 105 may execute a set of instructions to control the functional elements of the base station 105 to perform the functions described below. Additionally or alternatively, a base station 105 may perform aspects of the functions described below using special-purpose hardware.

At 1605, the base station 105 may identify a set of parameters for transmission of data via a shared channel over multiple TTIs. The operations of 1605 may be performed according to the methods described herein. In some examples, aspects of the operations of 1605 may be performed by a parameter manager as described with reference to FIGS. 12 through 15.

At 1610, the base station 105 may transmit, to a UE 115, a multi-TTI grant including a base grant and an extended grant, where the base grant indicates a first subset of parameters and the extended grant indicates a second subset of parameters. The operations of 1610 may be performed according to the methods described herein. In some examples, aspects of the operations of 1610 may be performed by a grant transmission component as described with reference to FIGS. 12 through 15.

At 1615, the base station 105 may communicate with the UE 115 in accordance with the first and second subsets of parameters. The operations of 1615 may be performed according to the methods described herein. In some examples, aspects of the operations of 1615 may be performed by a data component as described with reference to FIGS. 12 through 15.

Figure 17:
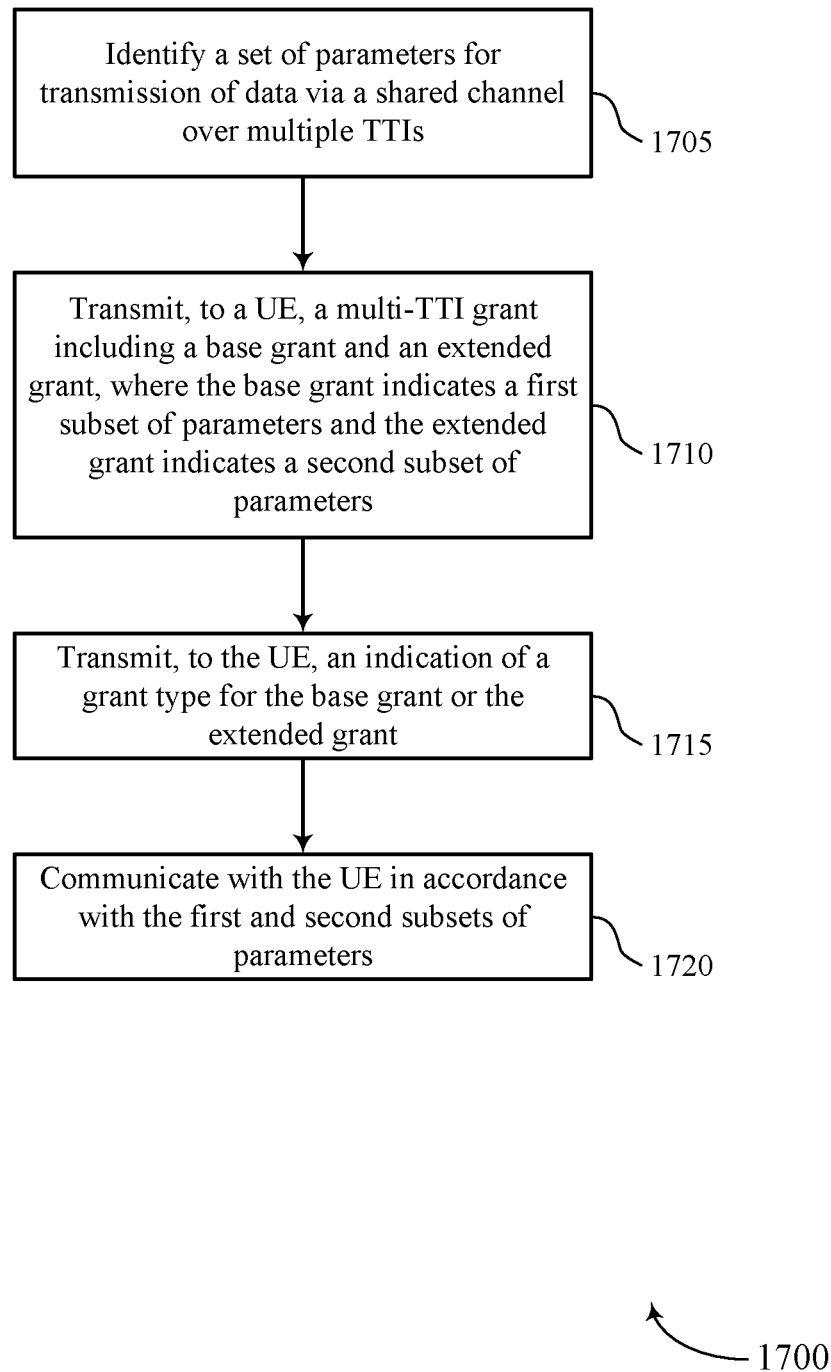

FIG. 17 shows a flowchart illustrating a method 1700 that supports techniques for base and extended grants in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station 105 may execute a set of instructions to control the functional elements of the base station 105 to perform the functions described below. Additionally or alternatively, a base station 105 may perform aspects of the functions described below using special-purpose hardware.

At 1705, the base station 105 may identify a set of parameters for transmission of data via a shared channel over multiple TTIs. The operations of 1705 may be performed according to the methods described herein. In some examples, aspects of the operations of 1705 may be performed by a parameter manager as described with reference to FIGS. 12 through 15.

At 1710, the base station 105 may transmit, to a UE 115, a multi-TTI grant including a base grant and an extended grant, where the base grant indicates a first subset of parameters and the extended grant indicates a second subset of parameters. The operations of 1710 may be performed according to the methods described herein. In some examples, aspects of the operations of 1710 may be performed by a grant transmission component as described with reference to FIGS. 12 through 15.

At 1715, the base station 105 may transmit, to the UE 115, an indication of a grant type for the base grant or the extended grant. The operations of 1715 may be performed according to the methods described herein. In some examples, aspects of the operations of 1715 may be performed by a grant transmission component as described with reference to FIGS. 12 through 15.

At 1720, the base station 105 may communicate with the UE 115 in accordance with the first and second subsets of parameters. The operations of 1720 may be performed according to the methods described herein. In some examples, aspects of the operations of 1720 may be performed by a data component as described with reference to FIGS. 12 through 15.

Figure 18:
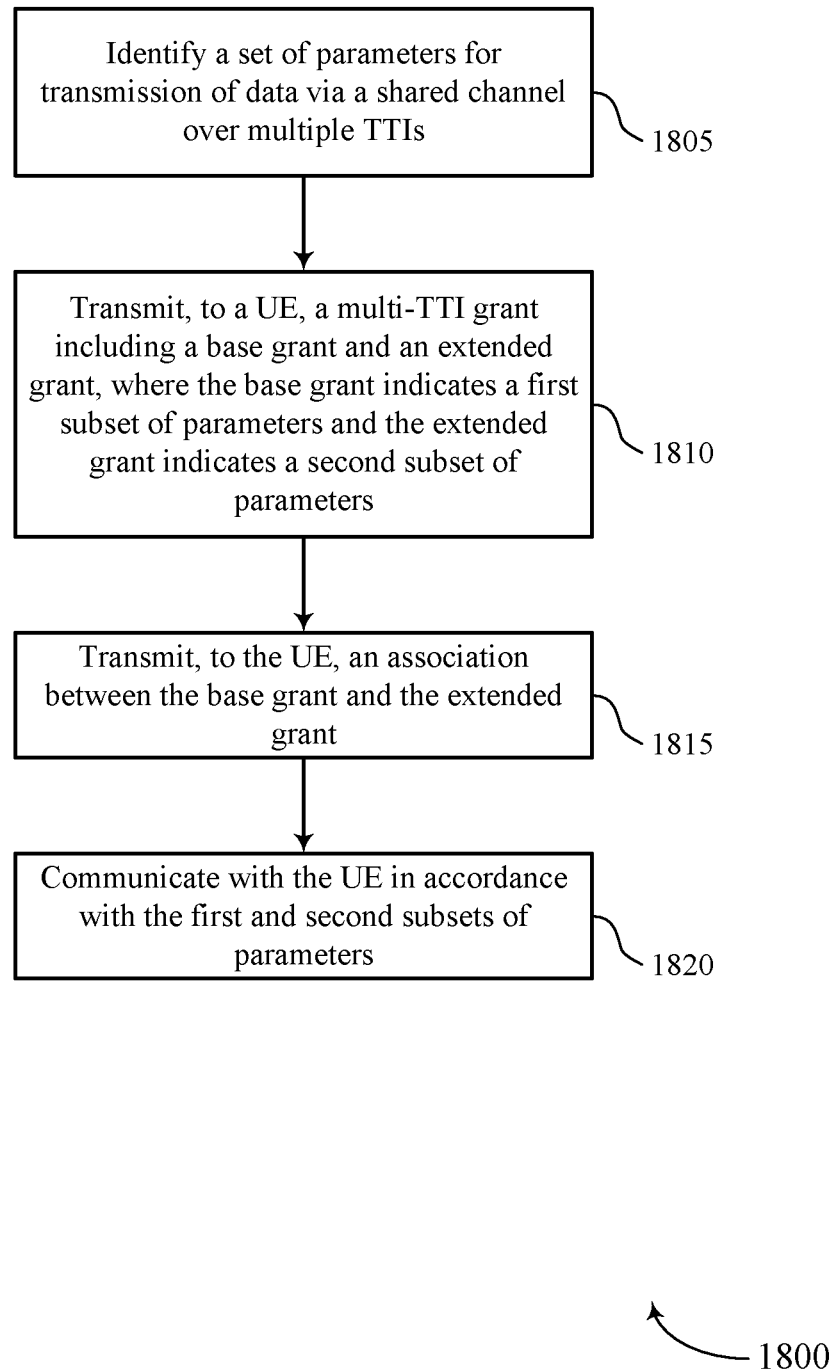

FIG. 18 shows a flowchart illustrating a method 1800 that supports techniques for base and extended grants in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station 105 may execute a set of instructions to control the functional elements of the base station 105 to perform the functions described below. Additionally or alternatively, a base station 105 may perform aspects of the functions described below using special-purpose hardware.

At 1805, the base station 105 may identify a set of parameters for transmission of data via a shared channel over multiple TTIs. The operations of 1805 may be performed according to the methods described herein. In some examples, aspects of the operations of 1805 may be performed by a parameter manager as described with reference to FIGS. 12 through 15.

At 1810, the base station 105 may transmit, to a UE 115, a multi-TTI grant including a base grant and an extended grant, where the base grant indicates a first subset of parameters and the extended grant indicates a second subset of parameters. The operations of 1810 may be performed according to the methods described herein. In some examples, aspects of the operations of 1810 may be performed by a grant transmission component as described with reference to FIGS. 12 through 15.

At 1815, the base station 105 may transmit, to the UE 115, an association between the base grant and the extended grant. The operations of 1815 may be performed according to the methods described herein. In some examples, aspects of the operations of 1815 may be performed by an association component as described with reference to FIGS. 12 through 15.

At 1820, the base station 105 may communicate with the UE 115 in accordance with the first and second subsets of parameters. The operations of 1820 may be performed according to the methods described herein. In some examples, aspects of the operations of 1820 may be performed by a data component as described with reference to FIGS. 12 through 15.

Figure 19:
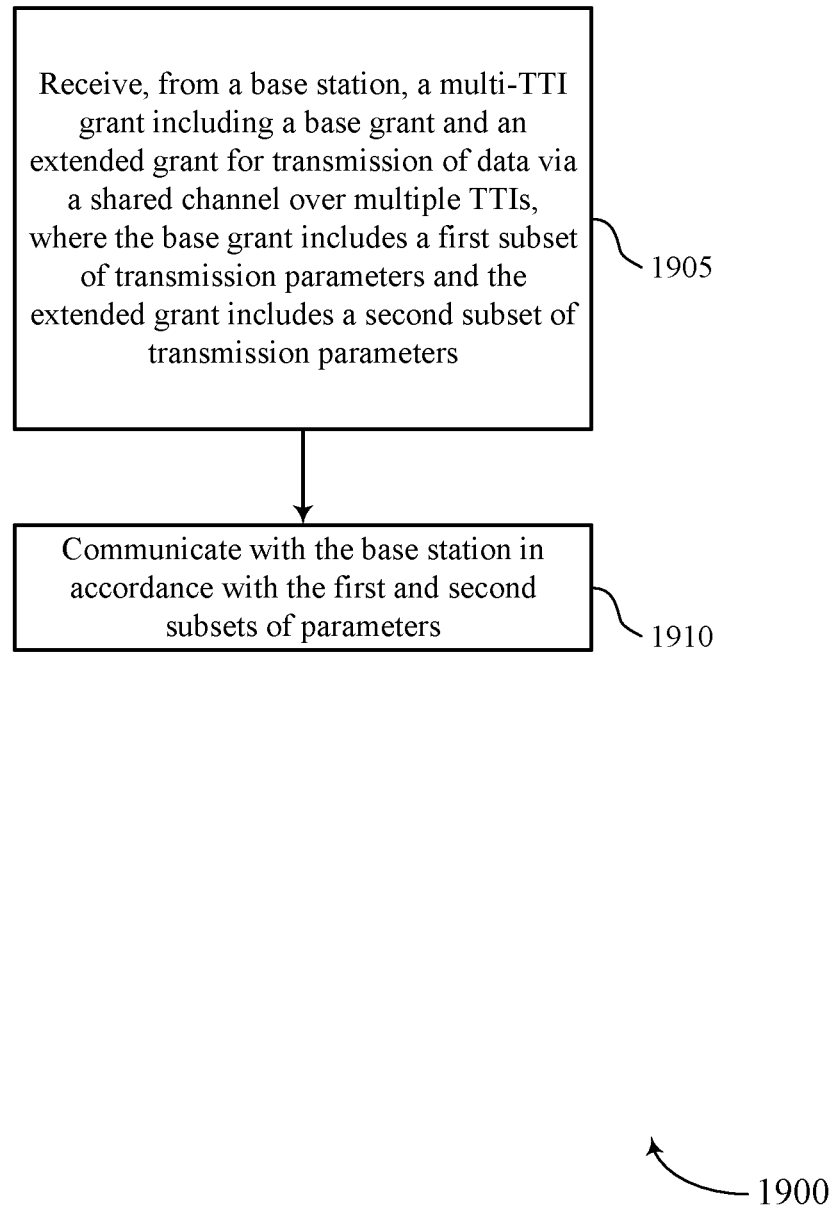

FIG. 19 shows a flowchart illustrating a method 1900 that supports techniques for base and extended grants in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE 115 may execute a set of instructions to control the functional elements of the UE 115 to perform the functions described below. Additionally or alternatively, a UE 115 may perform aspects of the functions described below using special-purpose hardware.

At 1905, the UE 115 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters. The operations of 1905 may be performed according to the methods described herein. In some examples, aspects of the operations of 1905 may be performed by a grant reception component as described with reference to FIGS. 8 through 11.

At 1910, the UE 115 may communicate with the base station 105 in accordance with the first and second subsets of parameters. The operations of 1910 may be performed according to the methods described herein. In some examples, aspects of the operations of 1910 may be performed by a communication component as described with reference to FIGS. 8 through 11.

Figure 20:
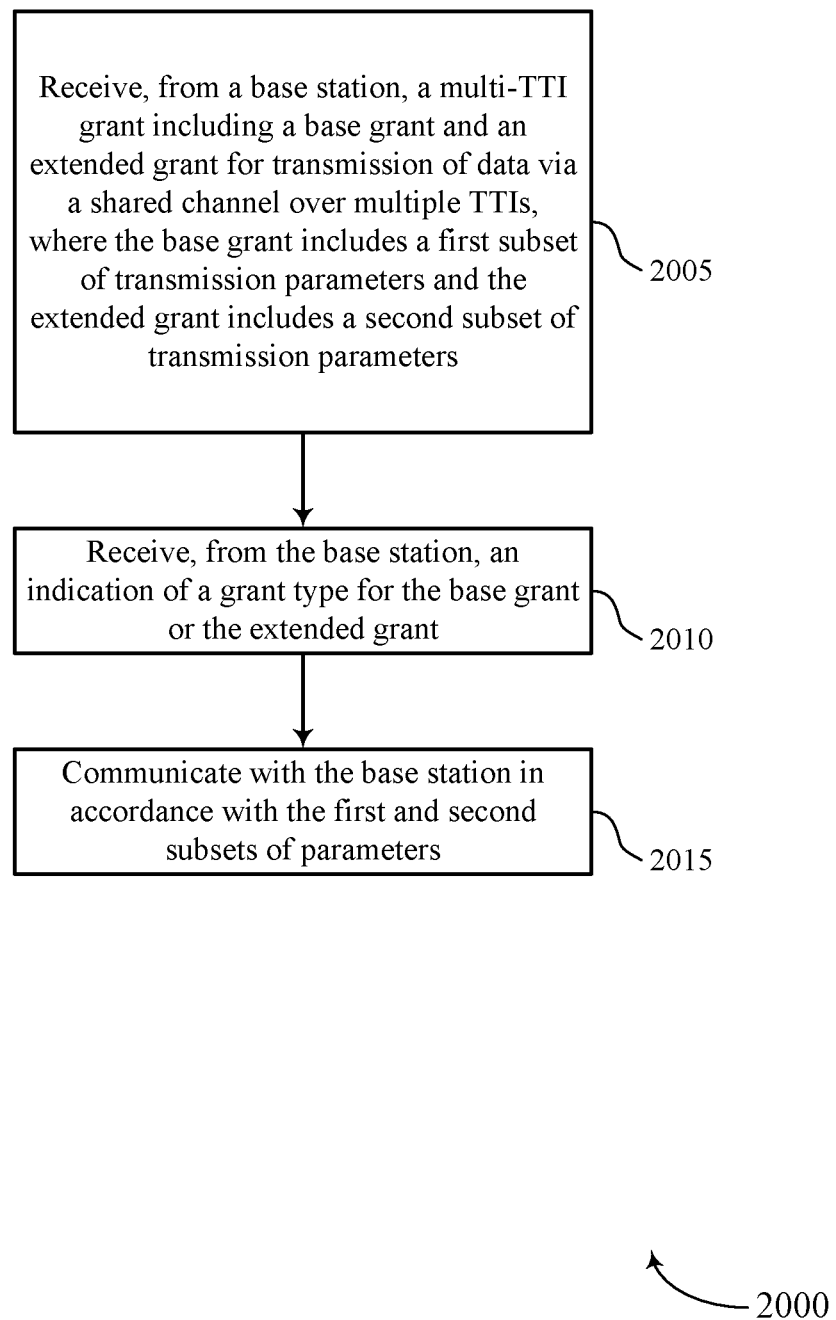

FIG. 20 shows a flowchart illustrating a method 2000 that supports techniques for base and extended grants in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE 115 may execute a set of instructions to control the functional elements of the UE 115 to perform the functions described below. Additionally or alternatively, a UE 115 may perform aspects of the functions described below using special-purpose hardware.

At 2005, the UE 115 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters. The operations of 2005 may be performed according to the methods described herein. In some examples, aspects of the operations of 2005 may be performed by a grant reception component as described with reference to FIGS. 8 through 11.

At 2010, the UE 115 may receive, from the base station 105, an indication of a grant type for the base grant or the extended grant. The operations of 2010 may be performed according to the methods described herein. In some examples, aspects of the operations of 2010 may be performed by a grant reception component as described with reference to FIGS. 8 through 11.

At 2015, the UE 115 may communicate with the base station 105 in accordance with the first and second subsets of parameters. The operations of 2015 may be performed according to the methods described herein. In some examples, aspects of the operations of 2015 may be performed by a communication component as described with reference to FIGS. 8 through 11.

Figure 21:
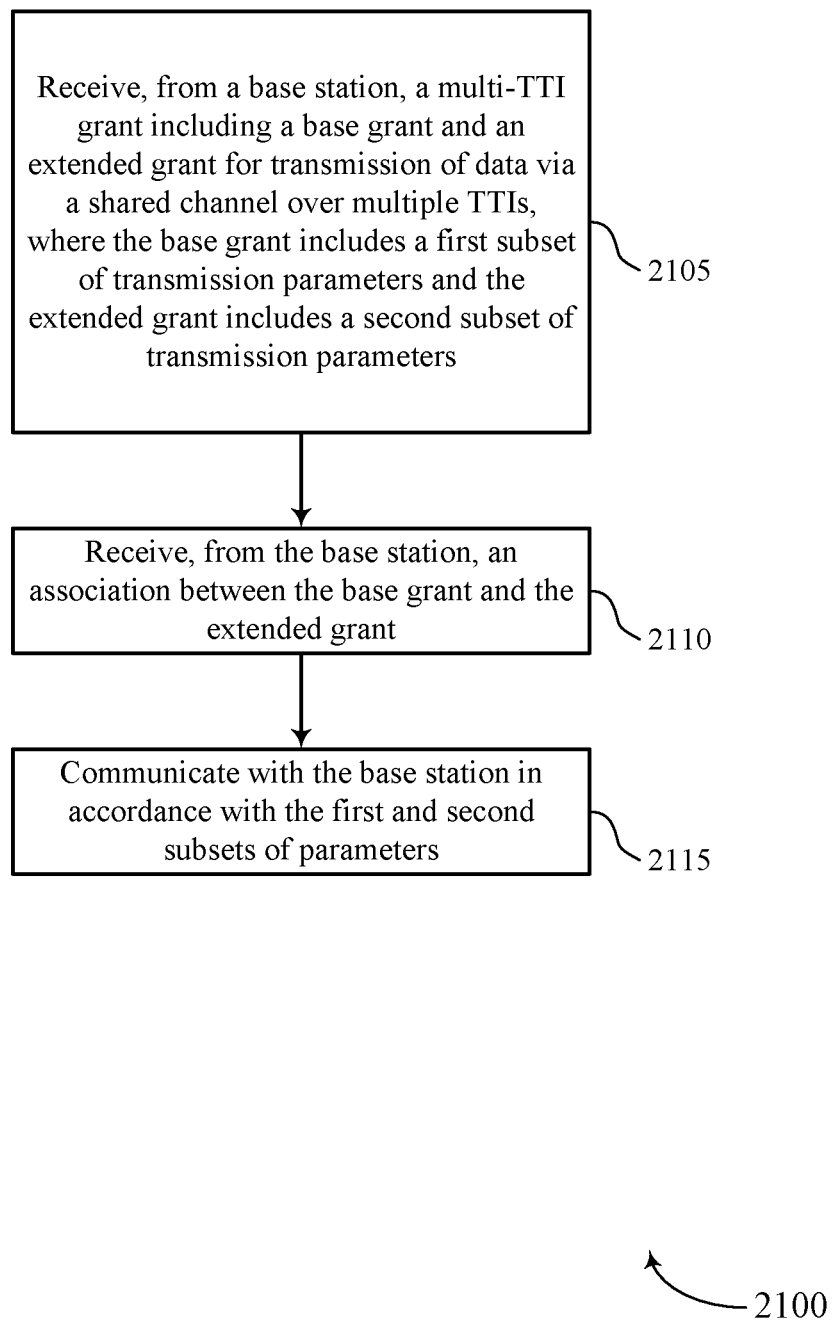

FIG. 21 shows a flowchart illustrating a method 2100 that supports techniques for base and extended grants in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE 115 may execute a set of instructions to control the functional elements of the UE 115 to perform the functions described below. Additionally or alternatively, a UE 115 may perform aspects of the functions described below using special-purpose hardware.

At 2105, the UE 115 may receive, from a base station 105, a multi-TTI grant including a base grant and an extended grant for transmission of data via a shared channel over multiple TTIs, where the base grant includes a first subset of transmission parameters and the extended grant includes a second subset of transmission parameters. The operations of 2105 may be performed according to the methods described herein. In some examples, aspects of the operations of 2105 may be performed by a grant reception component as described with reference to FIGS. 8 through 11.

At 2110, the UE 115 may receive, from the base station 105, an association between the base grant and the extended grant. The operations of 2110 may be performed according to the methods described herein. In some examples, aspects of the operations of 2110 may be performed by an association receiver as described with reference to FIGS. 8 through 11.

At 2115, the UE 115 may communicate with the base station 105 in accordance with the first and second subsets of parameters. The operations of 2115 may be performed according to the methods described herein. In some examples, aspects of the operations of 2115 may be performed by a communication component as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an application-specific integrated circuit (ASIC), a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    identifying a set of parameters for transmission of data via a shared channel over multiple transmission time intervals (TTIs), the set of parameters comprising a first subset of transmission parameters and a second subset of transmission parameters that is different from the first subset of transmission parameters;
    transmitting, to a user equipment (UE), a multi-TTI grant comprising a base grant and an extended grant, wherein the base grant indicates the first subset of transmission parameters and the extended grant indicates the second subset of transmission parameters; and
    communicating with the UE in accordance with the first and second subsets of transmission parameters.

2. The method of claim 1, further comprising:
    transmitting, to the UE, an indication of a grant type for the base grant or the extended grant.

3. The method of claim 2, wherein the indication is included in a multi-TTI grant and comprises a set of bits that indicate the grant type.

4. The method of claim 1, further comprising:
    transmitting, to the UE, an association between the base grant and the extended grant.

5. The method of claim 4, wherein the base grant and the extended grant are transmitted within the same TTI.

6. The method of claim 4, wherein transmitting the association comprises:
    transmitting, in a first TTI, the base grant corresponding to an association identifier (ID); and
    transmitting the extended grant corresponding to the base grant in a second TTI different from the first TTI.

7. The method of claim 6, wherein the association ID is included in a payload of the base grant, the extended grant, or both.

8. The method of claim 1, wherein the multi-TTI grant indicates a group of parameters that differ between a first TTI and a second TTI of the multiple TTIs.

9. The method of claim 8, wherein the group of parameters comprises code block group level transmission information (CBGLTI), a full new data indicator (NDI), total downlink assignment index (DAI), a hybrid automatic repeat request (HARQ) identifier (ID), a redundancy version (RV) ID, a resource allocation, mini-slot or full slot configuration information, a clear channel assessment (CCA) occasion, a downlink control information (DCI) parameter, a multi-input multi-output (MIMO) configuration, or any combination thereof.

10. The method of claim 1, further comprising:
    transmitting downlink control information (DCI) that indicates a number of mini-slots for clear channel assessment (CCA), a maximum or minimum number of mini-slots to use before switching to a slot, or a combination thereof.

11. The method of claim 1, wherein communicating with the UE comprises:
    receiving, from the UE, the transmission of data via the shared channel over multiple TTIs in accordance with the base grant and the extended grant.

12. A method for wireless communications, comprising:
    receiving, from a base station, a multi-TTI grant comprising a base grant and an extended grant for transmission of data via a shared channel over multiple transmission time intervals (TTIs), wherein the base grant comprises a first subset of transmission parameters and the extended grant comprises a second subset of transmission parameters that is different from the first subset of transmission parameters; and
    communicating with the base station in accordance with the first and second subsets of transmission parameters.

13. The method of claim 12, further comprising:
    receiving, from the base station, an indication of a grant type for the base grant or the extended grant.

14. The method of claim 13, wherein the indication is included in a multi-TTI grant and comprises a set of bits that indicate the grant type.

15. The method of claim 12, further comprising:
    receiving, from the base station, an association between the base grant and the extended grant.

16. The method of claim 15, wherein the base grant and the extended grant are received within the same TTI.

17. The method of claim 15, further comprising:
receiving, in a first TTI, the base grant corresponding to an association identifier (ID); and
receiving the extended grant corresponding to the base grant in a second TTI different from the first TTI.

18. The method of claim 17, wherein the association ID is included in a payload of the base grant, the extended grant, or both.

19. The method of claim 12, wherein the multi-TTI grant indicates a group of parameters that differ between a first TTI and a second TTI of the multiple TTIs.

20. The method of claim 19, wherein the group of parameters comprises code block group level transmission information (CBGLTI), a full new data indicator (NDI), total downlink assignment index (DAI), a hybrid automatic repeat request (HARQ) identifier (ID), a redundancy version (RV) ID, a resource allocation, mini-slot or full slot configuration information, a clear channel assessment (CCA) occasion, a downlink control information (DCI) parameter, a multi-input multi-output (MIMO) configuration, or any combination thereof.

21. The method of claim 12, wherein the multi-TTI is a grant for a downlink shared channel.

22. The method of claim 12, further comprising:
receiving downlink control information (DCI) that indicates a number of mini-slots for clear channel assessment (CCA), a maximum or minimum number of mini-slots to use before switching to a slot, or a combination thereof.

23. The method of claim 12 further comprising:
identifying a start location for performing a listen-before-talk (LBT) procedure based at least in part on receiving the multi-TTI grant.

24. The method of claim 12, further comprising:
performing a listen-before-talk (LBT) procedure prior to the transmission of data based at least in part on the multi-TTI grant; and
determining whether to transmit data based at least in part on a result of the LBT procedure.

25. The method of claim 12, further comprising:
identifying a set of TTIs of the multiple TTIs for transmission of a feedback message based at least in part on the multi-TTI grant;
performing a listen-before-talk (LBT) procedure prior to a start of transmission of the multiple TTIs; and
determining whether to transmit the feedback message based at least in part on a result of the LBT procedure.

26. The method of claim 25, further comprising:
determining a failure of the LBT procedure; and
transmitting the feedback message in a subsequent TTI delayed from the set of TTIs.

27. The method of claim 25, further comprising:
determining a failure of the LBT procedure; and
multiplexing the feedback message in a mini-slot or a start of a slot based at least in part on the failure.

28. The method of claim 12, wherein communicating with the base station comprises:
transmitting, to the base station, the transmission of data via the shared channel over multiple TTIs in accordance with the base grant and the extended grant.

29. An apparatus for wireless communications, comprising:
a processor,
memory coupled with the processor; and
instructions stored in the memory and executable by the processor to cause the apparatus to:
identify a set of parameters for transmission of data via a shared channel over multiple transmission time intervals (TTIs), the set of parameters comprising a first subset of transmission parameters and a second subset of transmission parameters that is different from the first subset of transmission parameters;
transmit, to a user equipment (UE), a multi-TTI grant comprising a base grant and an extended grant, wherein the base grant indicates the first subset of transmission parameters and the extended grant indicates the second subset of transmission parameters; and
communicate with the UE in accordance with the first and second subsets of transmission parameters.

30. An apparatus for wireless communications, comprising:
a processor,
memory coupled with the processor; and
instructions stored in the memory and executable by the processor to cause the apparatus to:
receive, from a base station, a multi-TTI grant comprising a base grant and an extended grant for transmission of data via a shared channel over multiple transmission time intervals (TTIs), wherein the base grant comprises a first subset of transmission parameters and the extended grant comprises a second subset of transmission parameters that is different from the first subset of transmission parameters; and
communicate with the base station in accordance with the first and second subsets of transmission parameters.

* * * * *